(12) United States Patent
Brown et al.

(10) Patent No.: US 12,439,869 B2
(45) Date of Patent: Oct. 14, 2025

(54) SPOTTED WATERMELON PLANTS

(71) Applicant: Enza Zaden Beheer B.V., Enkhuizen (NL)

(72) Inventors: Laura Barham Brown, Salinas, CA (US); Robert Barham, Salinas, CA (US)

(73) Assignee: Enza Zaden Beheer B.V., Enkhuizen (NL)

( * ) Notice: Subject to any disclaimer, the term of this patent is extended or adjusted under 35 U.S.C. 154(b) by 468 days.

(21) Appl. No.: 17/849,401

(22) Filed: Jun. 24, 2022

(65) Prior Publication Data

US 2023/0000035 A1 Jan. 5, 2023

Related U.S. Application Data

(60) Provisional application No. 63/214,697, filed on Jun. 24, 2021.

(51) Int. Cl.
*A01H 6/34* (2018.01)
*A01H 1/04* (2006.01)
*A01H 5/08* (2018.01)

(52) U.S. Cl.
CPC ............... *A01H 6/342* (2018.05); *A01H 1/04* (2013.01); *A01H 5/08* (2013.01)

(58) Field of Classification Search
CPC ........... A01H 6/342; A01H 1/054; A01H 5/08
See application file for complete search history.

(56) References Cited

U.S. PATENT DOCUMENTS

| | | |
|---|---|---|
| 5,777,196 A | 7/1998 | Hall |
| 5,948,957 A | 9/1999 | Chapko et al. |
| 5,959,185 A | 9/1999 | Streit et al. |
| 5,969,212 A | 10/1999 | Getschman |
| 5,973,234 A | 10/1999 | Mueller et al. |
| 5,977,445 A | 11/1999 | Soper et al. |
| 9,066,477 B2 | 6/2015 | Juarez |
| 9,066,478 B2 | 6/2015 | Juarez |
| 9,066,482 B1 | 6/2015 | Juarez |
| 9,408,354 B2 | 8/2016 | de Groot |
| 9,545,065 B2 | 1/2017 | Barham et al. |
| 9,848,548 B1 | 12/2017 | Bernier |
| 9,955,638 B2 | 5/2018 | Chang |
| 10,098,297 B2 | 10/2018 | Juarez |
| 10,687,495 B2 | 6/2020 | de Groot |
| 11,026,385 B2 | 6/2021 | Barham Brown et al. |
| 2013/0160167 A1 | 6/2013 | de Groot |
| 2018/0139920 A1 | 5/2018 | Chang |
| 2019/0343063 A1 | 11/2019 | Chang |
| 2020/0154665 A1 | 5/2020 | Brown et al. |
| 2020/0375138 A1 | 12/2020 | Barham Brown et al. |
| 2022/0022403 A1 | 1/2022 | Barham Brown et al. |
| 2022/0022404 A1 | 1/2022 | Barham Brown et al. |
| 2022/0046884 A1 | 2/2022 | Barham Brown et al. |
| 2022/0240470 A1 | 8/2022 | Barham Brown et al. |

OTHER PUBLICATIONS

Liu et al (2021 Scientia horticulturae 110140, pp. 1-6 (Year: 2021).*
Berry et al., (2003). "Assessing Probability of Ancestry Using Simple Sequence Repeat Profiles: Applications to Maize Inbred Lines and Soybean Varieties," Genetics, 165:331-342.
Clemson University, Published on Feb. 22, 2021. "Seedless Watermelon Variety Trial @ EREC—2021," available online at <https://www.clemson.edu/cafls/research/edisto/erecwatermelonvarietytrialreport2021.pdf>, 8 pages.
Compton et al., (1993). "Shoot Organogenesis and Plant Regeneration from Cotyledons of Diploid, Triploid, and Tetraploid Watermelon," J. Amer. Soc. Hort. Sci., 118(1):151-157.
Coolong, Timothy (2015). "Trial Report: Seedless Watermelon Variety Evaluation—2015," Available online at <https://site.extension.uga.edu/colquittag/files/2016/01/2015-UGA-Tifton-Watermelon-Variety-Trial-Results.pdf> 12 pages.
Cregan et al., (1999). "An Integrated Genetic Linkage Map of the Soybean Genome," Crop Science, 39:1464-1490.
Enza Zaden USA, Inc. Jan. 2020. 'Red Amber', 'Red Garnet', and 'Cracker Jack' Vegetable Seed Catalogue USA & Canada 2020. Available online at <https://webkiosk.enzazaden.com/catalogue-USA-2020/62983894>, Obtained on Jul. 24, 2020. p. 48.
Enza Zaden, "Cracker Jack (E26C.00063)", leaflet as of Nov. 2019, Available online at <http://webkiosk.enzazaden.com/leaflet-cracker-jack019/62935919>, 1 page.
Enza Zaden, "Enza Zaden Field Day: May 14, 2019", website as of Apr. 12, 2019, Available online at <https://www.enzazaden.com/us/news-and-events/news/enza-zaden-field-day-may-14>, Obtained on Feb. 10, 2020, 2 pages.
Enza Zaden, "Red Amber (E26C.00036)", leaflet as of Oct. 2017, Available online at <http://webkiosk.enzazaden.com/leaflet-watermelon-red-amber-2018/59618782>, 1.132 Declaration included. 3 pages.
Enza Zaden, "Red Garnet (E26C.00034)", leaflet as of Dec. 2017, Available online at <http://webkiosk.enzazaden.com/leaflet-watermelon-red-garnet-2018/59586596>, 1.132 Declaration included. 3 pages.
Enza Zaden, "Red Opal (E26C.00035)", leaflet as of Oct. 2017, Available online at <http://webkiosk.enzazaden.com/leaflet-watermelon-red-opal-2018/59618793>, 1 page.
Enza Zaden, (2019). "Gilroy Watermelon Field Day, Aug. 20, 2019", Enza Zaden USA, Inc., 2 pages.
Enza Zaden, (2019). "Redefining the watermelon industry, Field Day 2019", Enza Zaden USA, Inc., 4 pages.

(Continued)

*Primary Examiner* — Brent T Page
(74) *Attorney, Agent, or Firm* — Foley Hoag LLP; Brendan T. Jones; David E. Shore

(57) ABSTRACT

The present invention relates to methods of breeding with spotted watermelon, *Citrullus lanatus*, lines and varieties. More specifically, methods of making homozygous-spotted diploid watermelon lines (HSDL) for use in breeding and methods of making homozygous-spotted tetraploid watermelon lines (HSDL) for use in breeding are described. Further, methods of producing 33%, 66%, or 100% spotted triploid hybrid watermelon plants, as well as methods of producing 50% or 100% spotted diploid hybrid watermelon plants, are described. This invention further relates to markers able to determine the percentage of spotted allele present in spotted watermelon lines and varieties. In addition, this invention relates to new and distinctive lines and varieties of watermelon with a spotted phenotype.

18 Claims, 24 Drawing Sheets
(23 of 24 Drawing Sheet(s) Filed in Color)
Specification includes a Sequence Listing.

(56) References Cited

OTHER PUBLICATIONS

Ernest, E. (2018). "Seedless Watermelon Trials 2017," available online at <https://sites.udel.edu/weeklycropupdate/?p=11482>, 4 pages.

Guan et al. (2015). "Midwest Triploid Watermelon Variety Trial in Southwest Indiana—2015," Available online at <https://ag.purdue.edu/arge/swpap/Documents/2015%20seedless%20watermelon%20variety%20trial%20report%20at%20Southwest%20IN.pdf>, 12 pages.

Guan et al. (2018). "2018 Watermelon Variety Evaluation in Indiana," Available online at <https://ag.purdue.edu/arge/swpap/Documents/2018%20Watermelon%20Variety%20Evaluation%20in%20Indiana_.pdf>, 37 pages.

Guan et al., (2020). "2019 Standard-size and Personal-size Triploid Watermelon Variety Evaluation in Indiana," Southwest Purdue Agricultural Center, 31 pages.

Guan et al., Published on Nov. 2021. "2021 Standard-size Triploid Watermelon Variety Evaluation in Indiana," available online at <https://docs.lib.purdue.edu/cgi/viewcontent.cgi?article=1227&context=mwvtr>, 32 pages.

Guan, W. (2018). "Top Performing Watermelon Varieties in the 2017 Indiana Watermelon Variety Trial," available online at <https://vegcropshotline.org/article/top-performing-watermelon-varieties-in-the-2017-indiana-watermelon-variety-trial/>, 2 pages.

Johnson et al., (2019). "Seedless Watermelon Variety Trial Results 2019," University of Delaware Elbert N. & Ann V. Carvel Research and Education Center, 28 pages.

Ren et al., (2014). "An integrated genetic map based on four mapping populations and quantitative trait loci associated with economically important traits in watermelon (*Citrullus lanatus*)," BMC Plant Biology, 14:33, 11 pages.

Syngenta, (2017). "Watermelon Crop Guide," pp. 1 and 6. Syngenta US, 2 pages.

\* cited by examiner

```
                         SEQUENCE LISTING

<160> NUMBER OF SEQ ID NOS: 10

<210> SEQ ID NO 1
<211> LENGTH: 201
<212> TYPE: DNA
<213> ORGANISM: Artificial Sequence
<220> FEATURE:
<223> OTHER INFORMATION: Synthetic Construct
<220> FEATURE:
<221> NAME/KEY: misc_feature
<222> LOCATION: 101
<223> OTHER INFORMATION: n = A or T

<400> SEQUENCE: 1
atcaggtgag tttagatatg tttttctagg tgtttggtct aatagtttaa attttatgtt      60
tttaatttat tagatttgtt gttaaaatac actcaaaaag nagtagattt ggtaatttgg     120
caatttaccc aaactagaag agttctagtc attttctaaa aacacaatct tattttagcc     180
atttatcccg ttaacacaat t                                               201

<210> SEQ ID NO 2
<211> LENGTH: 121
<212> TYPE: DNA
<213> ORGANISM: Artificial Sequence
<220> FEATURE:
<223> OTHER INFORMATION: Synthetic Construct
<220> FEATURE:
<221> NAME/KEY: misc_feature
<222> LOCATION: 61
<223> OTHER INFORMATION: n = A or T

<400> SEQUENCE: 2
aatagtttaa attttatgtt tttaatttat tagatttgtt gttaaaatac actcaaaaag      60
nagtagattt ggtaatttgg caatttaccc aaactagaag agttctagtc attttctaaa    120
a                                                                    121

<210> SEQ ID NO 3
<211> LENGTH: 26
<212> TYPE: DNA
<213> ORGANISM: Artificial Sequence
<220> FEATURE:
<223> OTHER INFORMATION: Synthetic Construct

<400> SEQUENCE: 3
ggtgagttta gatatgtttt tctagg                                          26

<210> SEQ ID NO 4
<211> LENGTH: 24
<212> TYPE: DNA
```

```
<213> ORGANISM: Artificial Sequence
<220> FEATURE:
<223> OTHER INFORMATION: Synthetic Construct

<400> SEQUENCE: 4
attgtgttaa cgggataaat ggct                                          24

<210> SEQ ID NO 5
<211> LENGTH: 32
<212> TYPE: DNA
<213> ORGANISM: Artificial Sequence
<220> FEATURE:
<223> OTHER INFORMATION: Synthetic Construct

<400> SEQUENCE: 5
cactcaaaaa gaagtagatt tggtaatttg gg                                 32

<210> SEQ ID NO 6
<211> LENGTH: 201
<212> TYPE: DNA
<213> ORGANISM: Artificial Sequence
<220> FEATURE:
<223> OTHER INFORMATION: Synthetic Construct
<220> FEATURE:
<221> NAME/KEY: misc_feature
<222> LOCATION: 101
<223> OTHER INFORMATION: n = A or G

<400> SEQUENCE: 6
tttatgatat gggagaagaa aagagggag aaaaaagctc attgggatca gaaaagaagg     60
aaaggaggag gaagaagagt ttgtttgaat ggagtaaagg ngaagaggta aatctagtga   120
agaagctgat tgagttccgt acaaagaaga tgggtgacga agaattttat ccgttttga   180 gaaacgggtc attggctgag g                                            201

<210> SEQ ID NO 7
<211> LENGTH: 121
<212> TYPE: DNA
<213> ORGANISM: Artificial Sequence
<220> FEATURE:
<223> OTHER INFORMATION: Synthetic Construct
<220> FEATURE:
<221> NAME/KEY: misc_feature
<222> LOCATION: 61
<223> OTHER INFORMATION: n = A or G

<400> SEQUENCE: 7
attgggatca gaaaagaagg aaaggaggag gaagaagagt ttgtttgaat ggagtaaagg    60
ngaagaggta aatctagtga agaagctgat tgagttccgt acaaagaaga tgggtgacga   120
a                                                                  121

<210> SEQ ID NO 8
<211> LENGTH: 24
<212> TYPE: DNA
<213> ORGANISM: Artificial Sequence
<220> FEATURE:
<223> OTHER INFORMATION: Synthetic Construct

<400> SEQUENCE: 8
atcagaaaag aaggaaagga ggag                                          24

<210> SEQ ID NO 9
<211> LENGTH: 24
<212> TYPE: DNA
<213> ORGANISM: Artificial Sequence
```

```
<220> FEATURE:
<223> OTHER INFORMATION: Synthetic Construct

<400> SEQUENCE: 9
ctttgtacgg aactcaatca gctt                                                24

<210> SEQ ID NO 10
<211> LENGTH: 30
<212> TYPE: DNA
<213> ORGANISM: Artificial Sequence
<220> FEATURE:
<223> OTHER INFORMATION: Synthetic Construct

<400> SEQUENCE: 10
tgtttgaatg gagtaaagga gaagaggtat                                          30
```

SPOTTED WATERMELON PLANTS

CROSS-REFERENCE TO RELATED APPLICATIONS

This application claims the benefit of U.S. Provisional Application No. 63/214,697, filed Jun. 24, 2021, which is hereby incorporated by reference in its entirety.

SUBMISSION OF SEQUENCE LISTING AS ASCII TEXT FILE

The content of the following submission on ASCII text file is incorporated herein by reference in its entirety: a computer readable form (CRF) of the Sequence Listing (file name: 70180-2019400SEQLIST.TXT, date recorded: Jun. 23, 2022, size: 3,024 bytes).

FIELD OF THE INVENTION

The present invention relates to the field of plant breeding. In particular, this invention relates to methods of breeding with spotted watermelon, *Citrullus lanatus*, lines and varieties. This invention further relates to markers able to determine the percentage of spotted allele present in spotted watermelon lines and varieties. In addition, this invention relates to new and distinctive lines and varieties of watermelon with a spotted phenotype.

BACKGROUND OF THE INVENTION

All cultivated forms of watermelon belong to the polymorphic species *Citrullus lanatus*. As a crop, watermelons are grown commercially wherever environmental conditions permit the production of an economically viable yield. Cultivated watermelons grow as annual plants with large, broad leaves. The leaves may be lobed or simple and are typically orbicular to triangular-ovate in shape. The flowers are monoecious, producing both male and female flowers. The flesh color of cultivated watermelons is red, yellow, or white with ovate to oblong strongly compressed seeds that may be brown or white in color. The characterization of the mature fruit can vary widely among varieties of watermelon. Fruits may be round to oblong or elliptical with rind colors varying from dark green to yellow and rind patterning varying widely.

Many changes that occurred with the domestication of the watermelon relate to fruit morphology, with a specialization in fruit shape, size, and flavor. Cultivated watermelons can vary from 5 to 45 pounds, depending on the variety or line. In the United States, watermelon is grown in at least 44 states, but the principal watermelon growing states are Georgia, Florida, Texas, and California. Asia is the largest producer of watermelon, with 83.4% of the world production in 2011. Fresh watermelons are consumed in many forms, generally fresh, sliced, or as an ingredient in prepared foods. Over 80% of watermelons grown in the United States are triploid seedless varieties, preferred for their ease of consumption, increased yield, and premium market value over diploid seeded varieties.

*Citrullus lanatus* is a member of the family Cucurbitaceae, which contains about 90 genera and 700 to 760 species. The family includes melons, pumpkins, squashes, gourds, cucumber, loofah, and many weeds. The genus *Citrullus*, to which the watermelon belongs, consists of about four species, including *C. colocynthis*, *C. rehmii*, and *C. ecirrhosus*, all of which may be crossed with each other successfully. The watermelon is believed to be native to southern Africa and has been cultivated there for about 4000 years.

Regular, seeded watermelon is diploid and has eleven pairs of chromosomes (2n=2x=22). There also exist tetraploid varieties, which have 44 chromosomes in their somatic cells (2n=4x=44). Popular "seedless" varieties are triploid, meaning they have 33 chromosomes in their somatic cells (3x=33) and are derived from a cross between male diploid and female tetraploid parents. Triploid plants are unable to produce viable gametes; therefore, when triploid plants are grown in the presence of diploid plants, the triploid plants produce seedless fruit. These seedless varieties may sometimes produce fruit with small, edible white ovules, similar to those in immature cucumbers.

Watermelon is an important and valuable field crop with an array of observable and detectable traits of importance both to watermelon consumers and watermelon growers. Traits of importance include taste, texture, size, rind patterns, and shapes. Watermelon consumers desire watermelons that have excellent taste and sweetness. In addition, the texture and firmness of flesh is critical to the consumer experience of eating watermelons. Watermelon fruit may have a wide range of sizes, dozens of possible rind patterns, and an array of shapes from round to cylindrical. Consumers in different markets tend to prefer watermelons with particular sizes, rind patterns, and fruit shapes. Growers also focus on watermelon varieties that have high yields, disease resistances, and can produce fruit that have sufficiently good color and good appearance, as well as be free of defects such as hollow-heart, internal growth, or "seeds" in the seedless triploid hybrids.

One of the wide variety of colorations and patterns available in watermelon is a spotted pattern. The previously available watermelon that produced fruit with a spotted rind was primarily the heirloom variety 'Moon and Stars'. While this variety has an attractive appearance, it is lacking in commercially desirable characteristics. For example, the fruit flesh of 'Moon and Stars' is less saturated in color and less firm in consistency than desirable, and has a fibrous, stringy flesh texture. Further, the spotting of 'Moon and Stars' only represents one possible spotting type. In addition, the ability to breed new spotted varieties has been limited, because the 'Moon and Stars' heirloom variety is only available as a diploid. Specifically, in order to breed 66% and 100% spotted triploid hybrids, it is necessary to have a spotted tetraploid, which has not previously been available. There exists a need for spotted watermelon lines of different ploidies for use in breeding, and in order to produce varieties with a diverse array of spotted patterns and with commercially desirable characteristics. There also exists a need for markers suitable for use in breeding lines with spotted phenotypes.

SUMMARY OF THE INVENTION

In order to meet these needs, the present invention is directed to methods of producing high yielding and uniform spotted watermelon lines, and methods of using these lines to produce hybrid varieties with commercially desirable characteristics. Specifically, methods of making homozygous-spotted diploid watermelon lines (HSDL) for use in breeding and methods of making homozygous-spotted tetraploid watermelon lines (HSDL) for use in breeding are described. Further, methods of producing 33%, 66%, or 100% spotted triploid hybrid watermelon plants, as well as methods of producing 50% or 100% spotted diploid hybrid watermelon plants, are described. In addition, this invention is directed to markers able to determine the percentage of spotted allele present in spotted watermelon lines and varieties.

In one aspect, the present invention is directed to methods of producing a homozygous-spotted diploid watermelon line (HSDL), including: (a) crossing a first diploid watermelon plant with a spotted trait with a second diploid watermelon plant without the spotted trait to produce progeny watermelon seed, wherein the presence of the spotted trait is determined by visually phenotyping for the spotted trait or by genotyping to identify a presence of a marker linked to a spotted allele, wherein the spotted allele is located between position 134886 and position 86340 on Chromosome 4 of a 'Charleston Gray' genome; (b) crossing a watermelon plant grown from the progeny watermelon seed with itself or a second watermelon plant to produce additional progeny watermelon seed; (c) planting the additional progeny watermelon seed of step (b) to produce additional watermelon plants; (d) selecting watermelon plants with the spotted trait from the additional watermelon plants of step (c); (e) repeating the crossing of step (b), the planting of step (c), and the selecting of step (d) for an additional 3-10 generations to produce a homozygous-spotted diploid watermelon line (HSDL), wherein the HSDL is 100% spotted. In one embodiment, the first diploid plant of step (a) is homozygous for the spotted allele or heterozygous for the spotted allele. In another embodiment, the marker includes a first marker including a T at position 101 of SEQ ID NO: 1 and/or a second marker including a G at position 101 of SEQ ID NO: 6. In a further embodiment, genotyping of the first marker includes the use of a forward primer including SEQ ID NO: 3, a reverse primer including SEQ ID NO: 4, and/or a probe including SEQ ID NO: 5, and genotyping of the second marker includes the use of a forward primer including SEQ ID NO: 8, a reverse primer including SEQ ID NO: 9, and/or a probe including SEQ ID NO: 10.

Some embodiments of the present invention are directed to the HSDL plant produced by the method of any of the preceding embodiments.

Further embodiments of the present invention are directed to methods of producing a homozygous-spotted tetraploid watermelon line (HSTL), including: (a) doubling a chromosome number of the HSDL plant of claim 5, thereby producing a homozygous-spotted tetraploid watermelon line (HSTL), wherein the HSTL is 100% spotted.

Additional embodiments of the present invention are directed to methods of producing a 33% spotted triploid hybrid watermelon plant, including: (a) crossing the HSDL plant of claim 5 onto a 0% spotted tetraploid inbred plant, wherein the HSDL plant is a male parent and the tetraploid inbred plant is a female parent, to produce a 33% spotted triploid hybrid watermelon plant. Some embodiments of the present invention are directed to the 33% spotted triploid hybrid watermelon plant produced by the method of the preceding embodiment.

Yet further embodiments of the present invention are directed to methods of producing a 50% or 100% spotted diploid hybrid watermelon plant, including: (a) crossing the HSDL plant of claim 5 onto a 0% spotted diploid inbred plant or onto a second HSDL plant of claim 5, thereby producing a 50% or 100% spotted diploid hybrid watermelon plant. Some embodiments of the present invention are directed to the 50% or 100% spotted diploid hybrid watermelon plant produced by the method of the preceding embodiment.

In another aspect, the present invention is directed to methods of producing a homozygous-spotted tetraploid watermelon line (HSTL), including: (a) providing a diploid watermelon plant with a spotted trait, wherein the presence of the spotted trait is determined by visually phenotyping for the spotted trait or by genotyping to identify a presence of a marker linked to a spotted allele, and wherein the spotted allele is located between position 134886 and position 86340 on Chromosome 4 of a 'Charleston Gray' genome; (b) doubling a chromosome number of the diploid watermelon plant to produce a tetraploid watermelon plant with the spotted trait; (c) crossing the tetraploid watermelon plant with a non-spotted watermelon plant to produce a F1 generation of watermelon plants; (d) self-pollinating or open pollinating the F1 generation of watermelon plants to produce a F2 generation of watermelon plants; (e) phenotyping progeny watermelon plants from the F2 generation to identify the presence of the spotted trait and/or genotyping progeny watermelon plants from the F2 generation to identify the presence of the marker linked to the spotted allele and using the marker to determine a dosage of the spotted allele; (f) selecting progeny watermelon plants with the highest dosage of the spotted allele; (g) repeating the self-pollinating of step (d), the genotyping of step (e), and the selecting of step (f) for an additional 3-10 generations to produce a homozygous-spotted tetraploid watermelon line (HSTL), wherein the HSTL is 100% spotted. In one embodiment, the tetraploid plant of step (b) is homozygous for the spotted allele or heterozygous for the spotted allele. In another embodiment, the marker includes a first marker including a T at position 101 of SEQ ID NO: 1 and/or a second marker including a G at position 101 of SEQ ID NO: 6. In a further embodiment, genotyping of the first marker includes the use of a forward primer including SEQ ID NO: 3, a reverse primer including SEQ ID NO: 4, and/or a probe including SEQ ID NO: 5, and wherein genotyping of the second marker includes the use of a forward primer including SEQ ID NO: 8, a reverse primer including SEQ ID NO: 9, and/or a probe including SEQ ID NO: 10.

Some embodiments of the present invention are directed to the HSTL plant produced by the method of any of the preceding embodiments.

Additional embodiments of the present invention are directed to methods of producing a 66% spotted triploid hybrid watermelon plant, including: (a) crossing the HSTL plant of claim 13 onto a 0% spotted diploid inbred plant, wherein the HSTL plant is a female parent and the diploid inbred plant is a male parent, to produce a 66% spotted triploid hybrid watermelon plant. Some embodiments of the present invention are directed to the 66% spotted triploid hybrid watermelon plant produced by the method of the preceding embodiment.

Further embodiments of the present invention are directed to methods of producing a 100% spotted triploid hybrid watermelon plant, including: (a) crossing the HSDL plant of claim 5 with the HSTL plant of claim 13 to produce a 100% spotted triploid hybrid watermelon plant. Some embodiments of the present invention are directed to the 100% spotted triploid hybrid watermelon plant produced by the method of the preceding embodiment.

In yet another aspect, the present invention is directed to methods of selecting a spotted watermelon plant, including: (a) crossing a spotted watermelon plant to a watermelon plant to produce a population of progeny watermelon plants; (b) genotyping the population of progeny watermelon plants for a presence of a marker linked to a spotted allele, wherein the spotted allele is located between position 134886 and position 86340 on Chromosome 4 of a 'Charleston Gray' genome; and (c) selecting a progeny plant on the basis of the presence of the one or more sequences genotyped in (b), wherein the progeny watermelon plant is spotted. In one embodiment, the marker includes a first marker including a T at position 101 of SEQ ID NO: 1 and/or a second marker including a G at position 101 of SEQ ID NO: 6, and wherein genotyping of the first marker includes the use of a forward primer including SEQ ID NO: 3, a reverse primer including SEQ ID NO: 4, and/or a probe including SEQ ID NO: 5, and wherein genotyping of the second marker includes the use of a forward primer including SEQ ID NO: 8, a reverse primer including SEQ ID NO: 9, and/or a probe including SEQ ID NO: 10.

In still another aspect, the present invention is directed to methods of selecting a spotted watermelon plant, including: (a) providing a test spotted watermelon plant and a control spotted watermelon plant; (b) using a PCR-based technique to assess the presence of one or more sequences selected from the group of a sequence including T at position 101 of SEQ ID NO: 1 or a sequence including a G at position 101 of SEQ ID NO: 6; and (c) determining the percentage of the spotted allele in the test spotted watermelon plant based on a comparison between the results of step (b) for the test spotted watermelon plant and the control spotted watermelon plant. In one embodiment, the PCR-based technique of step (b) includes the use of primers and probes selected from the group of SEQ ID NO: 3, SEQ ID NO: 4, SEQ ID NO: 5, SEQ ID NO: 8, SEQ ID NO: 9, or SEQ ID NO: 10.

ENUMERATED EMBODIMENTS

1. A method of producing a homozygous-spotted diploid watermelon line (HSDL), comprising:
   (a) crossing a first diploid watermelon plant with a spotted trait with a second diploid watermelon plant without the spotted trait to produce progeny watermelon seed;
   (b) crossing a watermelon plant grown from the progeny watermelon seed with itself or a second watermelon plant to produce additional progeny watermelon seed;
   (c) planting the additional progeny watermelon seed of step (b) to produce additional watermelon plants;
   (d) selecting watermelon plants with the spotted trait from the additional watermelon plants of step (c);
   (d) repeating the crossing of step (b), the planting of step (c), and the selecting of step (d) for an additional 3-10 generations to produce a homozygous-spotted diploid watermelon line (HSDL).
2. The method of embodiment 1, wherein the first diploid plant of step (a) is homozygous or heterozygous for a genetic determinant conferring the spotted trait.
3. The method of embodiment 1 or embodiment 2, further comprising selecting one or more additional traits of interest at step (d), wherein the one or more additional traits of interest are selected from the group consisting of a fruit flesh color trait, a fruit flesh firmness trait, and a fruit taste trait.
4. A HSDL plant produced by the method of any one of embodiments 1-3.
5. A plant part from the plant of embodiment 4.
6. The plant part of embodiment 5, wherein said part is a leaf, an ovule, a pollen grain, a seed, a fruit, a cell, or a portion thereof.
7. A protoplast produced from the plant of embodiment 4.
8. A tissue culture of the plant of embodiment 4.
9. The tissue culture of embodiment 8, wherein said tissue culture is produced from a plant part selected from the group consisting of leaf, anther, pistil, stem, petiole, root, root tip, fruit, seed, flower, cotyledon, hypocotyl, embryo, and meristematic cell.
10. A watermelon plant regenerated from the tissue culture of embodiment 9, wherein the plant has all of the morphological and physiological characteristics of the HSDL plant of embodiment 4.
11. A method of producing a 33% spotted triploid hybrid watermelon plant, comprising: crossing the HSDL plant of embodiment 4 onto a tetraploid inbred plant without the spotted trait, wherein the HSDL plant is a male parent and the tetraploid inbred plant is a female parent, to produce a 33% spotted triploid hybrid watermelon plant.
12. The 33% spotted triploid hybrid watermelon plant produced by the method of embodiment 11.
13. A plant part from the plant of embodiment 12.
14. The plant part of embodiment 13, wherein said part is a leaf, an ovule, a pollen grain, a seed, a fruit, a cell, or a portion thereof.
15. A protoplast produced from the plant of embodiment 12.
16. A tissue culture of the plant of embodiment 12.
17. The tissue culture of embodiment 16, wherein said tissue culture is produced from a plant part selected from the group consisting of leaf, anther, pistil, stem, petiole, root, root tip, fruit, seed, flower, cotyledon, hypocotyl, embryo, and meristematic cell.
18. A watermelon plant regenerated from the tissue culture of embodiment 17, wherein the plant has all of the morphological and physiological characteristics of the 33% spotted triploid hybrid watermelon plant of embodiment 12.
19. A watermelon seed designated as 'E26S.00171', representative sample of seed having been deposited under NCIMB Accession Number X1.
20. A watermelon plant produced by growing the seed of embodiment 19.
21. A plant part from the plant of embodiment 20.
22. The plant part of embodiment 21, wherein said part is a leaf, an ovule, a pollen grain, a seed, a fruit, a cell, or a portion thereof.
23. The plant part of embodiment 22, wherein said part is a fruit.
24. A watermelon plant having all the physiological and morphological characteristics of the watermelon plant of embodiment 20.
25. A plant part from the plant of embodiment 24.
26. The plant part of embodiment 25, wherein said part is a leaf, an ovule, a pollen grain, a seed, a fruit, a cell, or a portion thereof.
27. A plant part of embodiment 26, wherein said part is a fruit.
28. A pollen grain or an ovule of the plant of embodiment 20.
29. A protoplast produced from the plant of embodiment 20.
30. A tissue culture of the plant of embodiment 20.
31. The tissue culture of embodiment 30, wherein said tissue culture is produced from a plant part selected from the group consisting of leaf, anther, pistil, stem, petiole, root, root tip, fruit, seed, flower, cotyledon, hypocotyl, embryo, and meristematic cell.
32. A watermelon plant regenerated from the tissue culture of embodiment 31, wherein the plant has all of the morphological and physiological characteristics of a watermelon plant produced by growing watermelon seed designated as 'E26S.00171', representative sample of seed having been deposited under NCIMB Accession Number X1.

33. A method of producing seedless watermelon fruit, the method comprising:
    (a) crossing a first 'E26S.00171' watermelon plant, representative sample of seed having been deposited under NCIMB Accession Number X1, with a second diploid watermelon plant;
    (b) allowing seedless fruit to form; and
    (c) harvesting the seedless fruit.
34. A diploid watermelon plant that produces fruit with a spotted rind, a dark red fruit flesh color, and a firm fruit flesh texture.
35. A triploid watermelon plant that produces fruit with a spotted rind, a dark red fruit flesh color, and a firm fruit flesh texture.

In addition to the exemplary aspects and embodiments described above, further aspects and embodiments will become apparent by reference by study of the following descriptions.

BRIEF DESCRIPTION OF THE DRAWINGS

The patent or application file contains at least one drawing executed in color. Copies of this patent or patent application publication with color drawings will be provided by the office upon request and payment of the necessary fee.

FIG. 1A shows whole fruit of watermelon hybrid 'E26S.00171'. FIG. 1B shows longitudinal cross-sections of fruit of watermelon hybrid 'E26S.00171'. FIG. 1C shows the upper side of a leaf with spots of watermelon hybrid 'E26S.00171'. FIG. 1D shows the lower side of a leaf with spots of watermelon hybrid 'E26S.00171'. FIG. 1E shows a female flower with a spot of watermelon hybrid 'E26S.00171'. FIG. 1F shows a female flower of watermelon hybrid 'E26S.00171'. FIG. 1G shows a male flower of watermelon hybrid 'E26S.00171'. FIG. 1H shows an immature fruit with a spot of watermelon hybrid 'E26S.00171'. FIG. 1I shows a plant with spots of watermelon hybrid 'E26S.00171'.

FIG. 3A shows leaves of sample 2. FIG. 3B shows leaves of sample 7. FIG. 3C shows leaves of sample 11. FIG. 3D shows leaves of sample 73. FIG. 3E shows leaves of sample 5. FIG. 3F shows leaves of sample 34. FIG. 3G shows leaves of sample 42. FIG. 3H shows leaves of sample 69. The leaves shown in FIGS. 3A-3D were later confirmed to all be homozygous for the spotted allele, and the leaves shown in FIGS. 3E-3H were later confirmed to all be heterozygous for the spotted allele.

FIG. 7A shows a cross-section of mature fruit showing fruit flesh (bottom), an upper surface of a leaf (middle), and a mature fruit of a first exemplary triploid watermelon variety with 100% spot allele. FIG. 7B shows an upper surface of a leaf (bottom) and a mature fruit of a second exemplary triploid watermelon variety with 100% spot allele. In FIGS. 7A-7B, the fruit rind and the leaves (upper and lower surface) are spotted.

DETAILED DESCRIPTION OF THE INVENTION

Figure 1A:
FIGS. 1A-1I show watermelon hybrid 'E26S.00171'.

The present invention is directed towards watermelon varieties exhibiting desired spotted phenotypes. Desired spotted phenotypes include fruit rinds with at least one yellow spot of a diameter of at least 0.2 cm, preferably multiple yellow spots scattered over a non-yellow background color. The background color may include any known watermelon color and rind pattern, including but not limited to dark green, medium green, peacock, gray, dark mottled stripe, and tiger stripe. Desired flesh characteristics include dark red, intense red, or vivid red color. Further, desired flesh characteristics include medium to firm flesh firmness. In an exemplary embodiment, the present invention is directed toward triploid watermelon plants that produce fruit with yellow-spotted rinds, a vivid red flesh color, and medium to firm flesh firmness.

These desired rind and flesh characteristics can be accomplished by crossing two watermelon plants such that the progeny watermelon plants exhibit rind and flesh characteristics of both parent plants. In an exemplary embodiment, the present invention is directed towards diploid watermelon plants that can be used to breed triploid, seedless, watermelon plants with spotted rinds and red flesh color. The diploid parent is used as the male parent, and the tetraploid parent is used as the female parent when breeding a triploid. In a preferred embodiment, the diploid watermelon plants used for breeding have spotted rinds, medium-firm flesh, fine (little fiber) flesh coarseness, and red flesh. In a further exemplary embodiment, the present invention is directed towards tetraploid watermelon plants that can be used to breed triploid, seedless, watermelon plants with spotted rinds and red flesh color. The tetraploid parent is used as the female parent, and the diploid parent is used as the male parent when breeding a triploid. In a preferred embodiment, the tetraploid watermelon plants used for breeding have spotted rinds, medium-firm flesh, fine (little fiber) flesh coarseness, and red flesh.

The present invention is directed towards diploid, triploid, and tetraploid varieties of watermelon exhibiting spotted patterning. This spotted patterning can be accomplished by crossing two watermelon plants such that the progeny watermelon plants exhibit patterning of both parent plants. In an exemplary embodiment, the present invention is directed towards triploid seedless watermelon plants. Triploid plants are produced by the cross of a diploid male and tetraploid female. Genes exhibited by triploid plants can be thought of as contributed by the parents in "doses." By way of example, if a diploid (2x) spotted plant A is crossed with a tetraploid (4x) plant B, the result of the cross would be triploid (3x) plant C, wherein plant C receives one set of genes from A and two sets of genes from B. It can be said that, in this exemplary cross, that plant C has one "dose" of genes from plant A and two "doses" of genes from plant B. By this model, genes can be transferred to progeny in a dose-dependent manner. In a further exemplary embodiment, the present invention is directed toward diploid hybrid watermelon plants. Diploid plants are produced by the cross of a diploid male and diploid female. By way of example, if a diploid (2x) spotted plant A is crossed with a diploid (2x) plant B, the result of the cross would be diploid (2x) plant C, wherein plant C receives one set of genes from A and one set of genes from B. It can be said that, in this exemplary cross, that plant C has one "dose" of genes from plant A and one "dose" of genes from plant B.

The dosage effect of the alleles underlying the spotted trait is additive. Therefore, a 33% (i.e., one-dose) spotted triploid hybrid watermelon plant, which has the spotted trait from its diploid male parent (one dose) and a non-spotted trait from its tetraploid female parent (two doses), has an appearance that is intermediate between non-spotted and fully spotted. It is, in essence, 66% non-spotted and 33% spotted, with an intermediate level of spotting. This intermediate level of spotting is highly valued as an attractive and desired level of spotting (i.e., the fruit is spotted, but not too spotted).

Figure 1B:
Figure 1C:
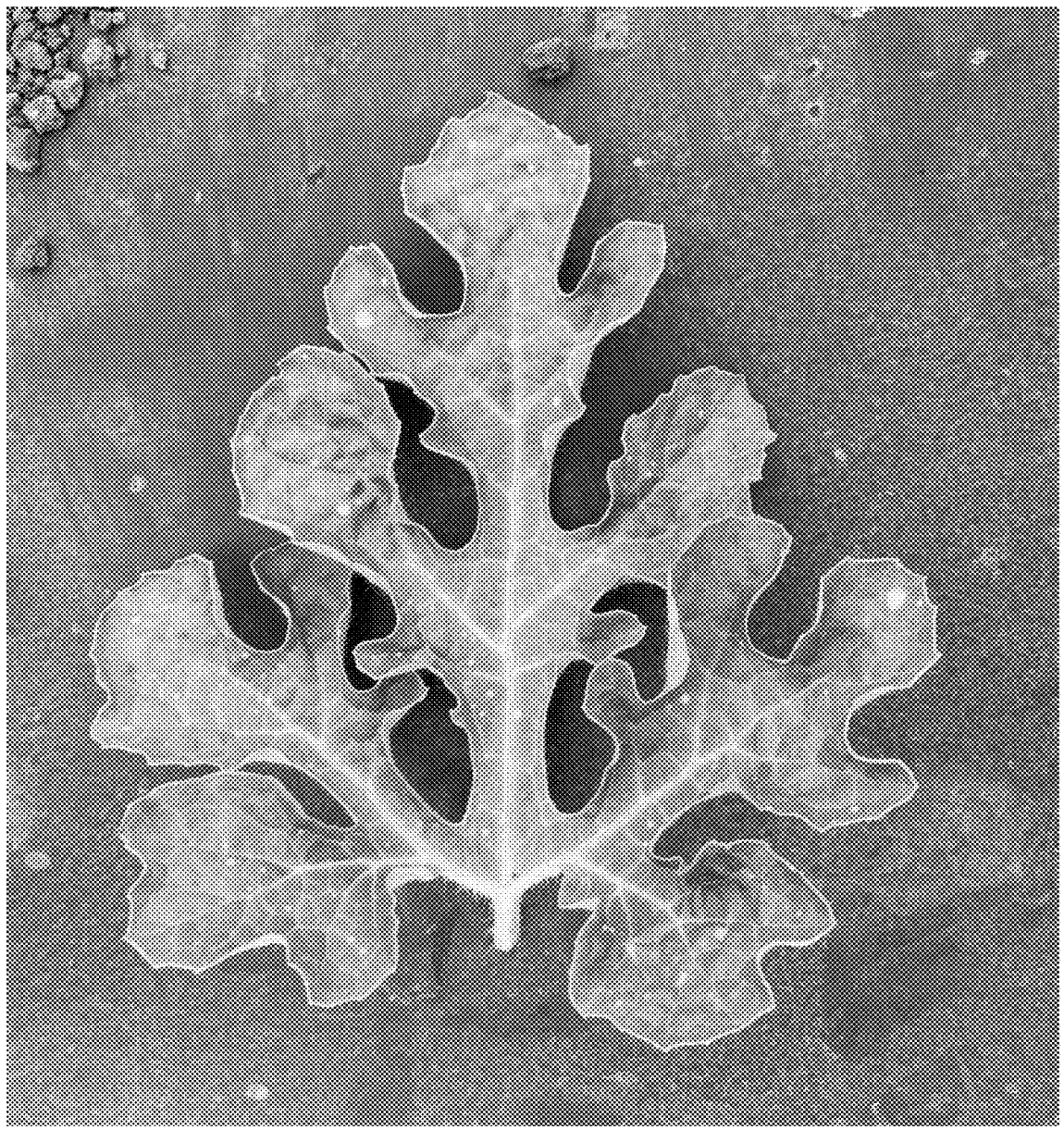
Figure 1D:
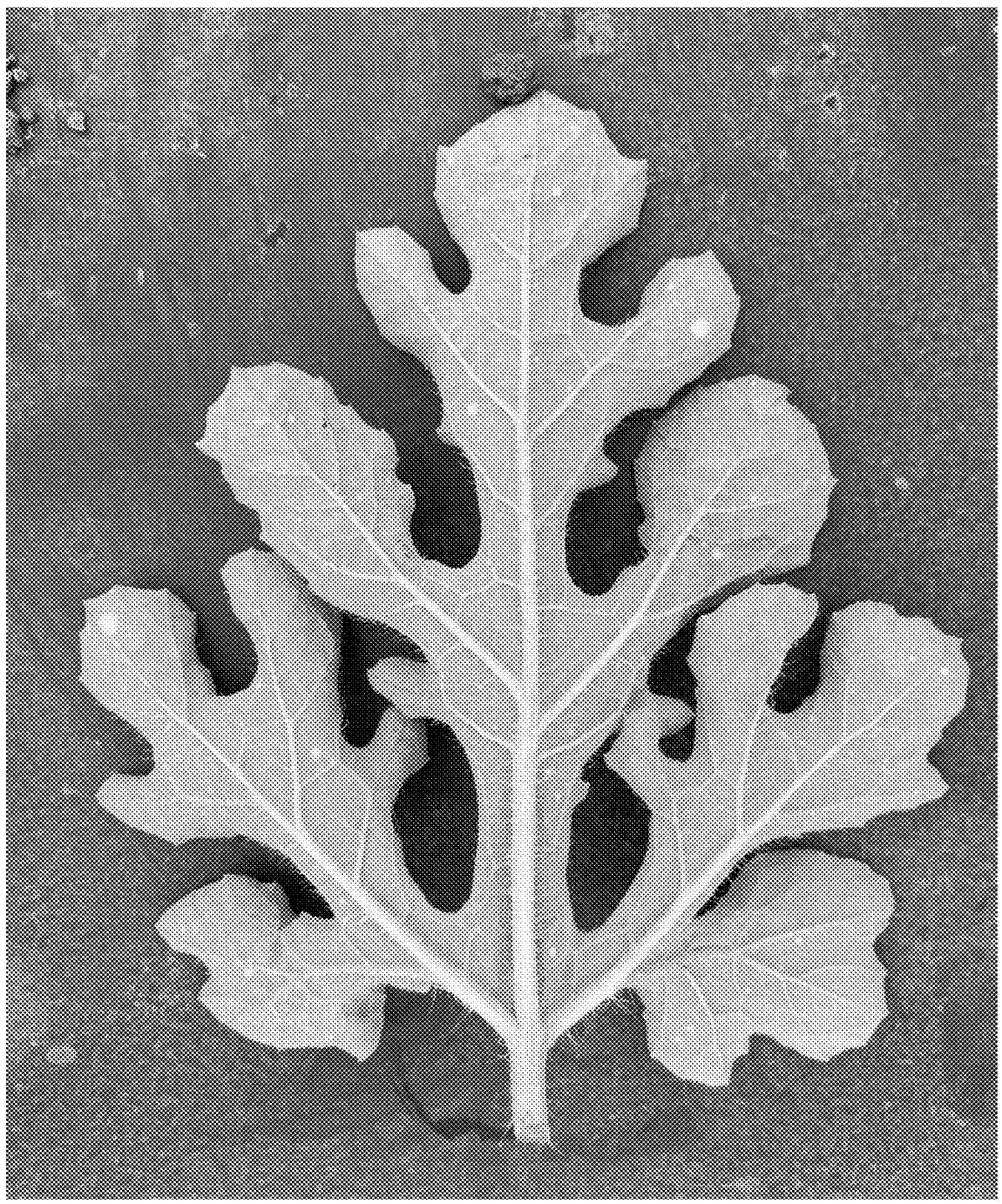
Figure 1E:
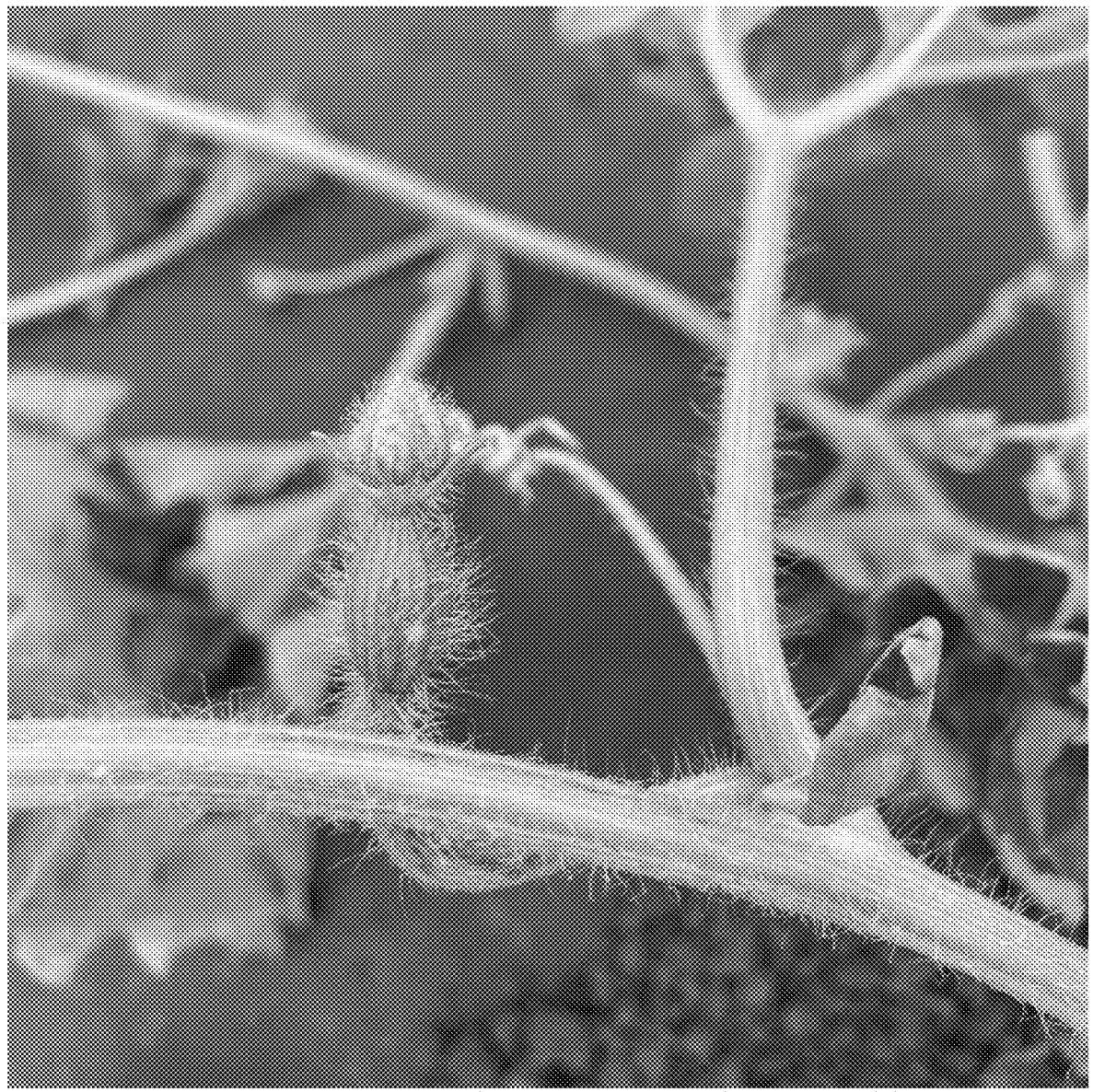
Figure 1F:
Figure 1G:
Figure 1H:
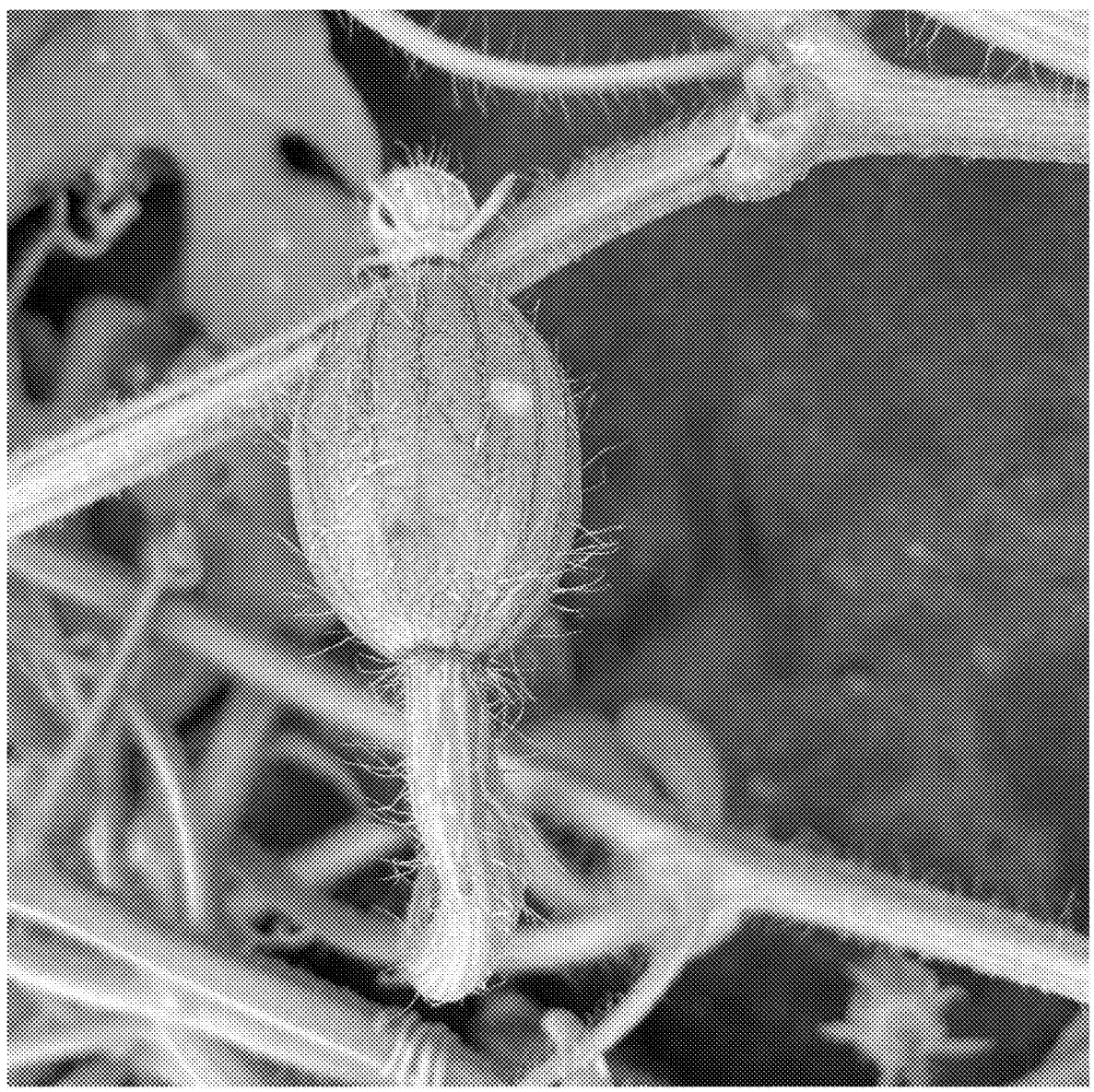
Figure 1I:

Watermelon hybrid 'E26S.00171' is an exemplary 33% spotted triploid hybrid. As can be seen in FIGS. 1A-1I, the spotting is present on the plant as well as the fruit. FIGS. 1C-1D show spotting on the leaves. FIG. 1E shows a spot on the immature female flower. FIG. 1H shows a spot on the immature fruit. In some embodiments, the fruit may show spots when immature (i.e., at young stages). In some embodiments, the fruit may show spots when more mature (i.e., when immature, spots are not shown on the fruit). Further, the immature fruit has a lighter green background rind pattern (see FIG. 1H) as compared to the mature rind pattern (see FIGS. 1A-1B). FIG. 1I shows a whole plant with spotting throughout. The spots on watermelon hybrid 'E26S.00171' are yellow. The majority of the spots are less than 2 cm in diameter, and spots range from 0.2 cm to 15 cm in diameter.

Figure 7A:
FIGS. 7A-7B show exemplary triploid watermelon varieties with 100% spot allele (i.e., three spot alleles).
Figure 7B:
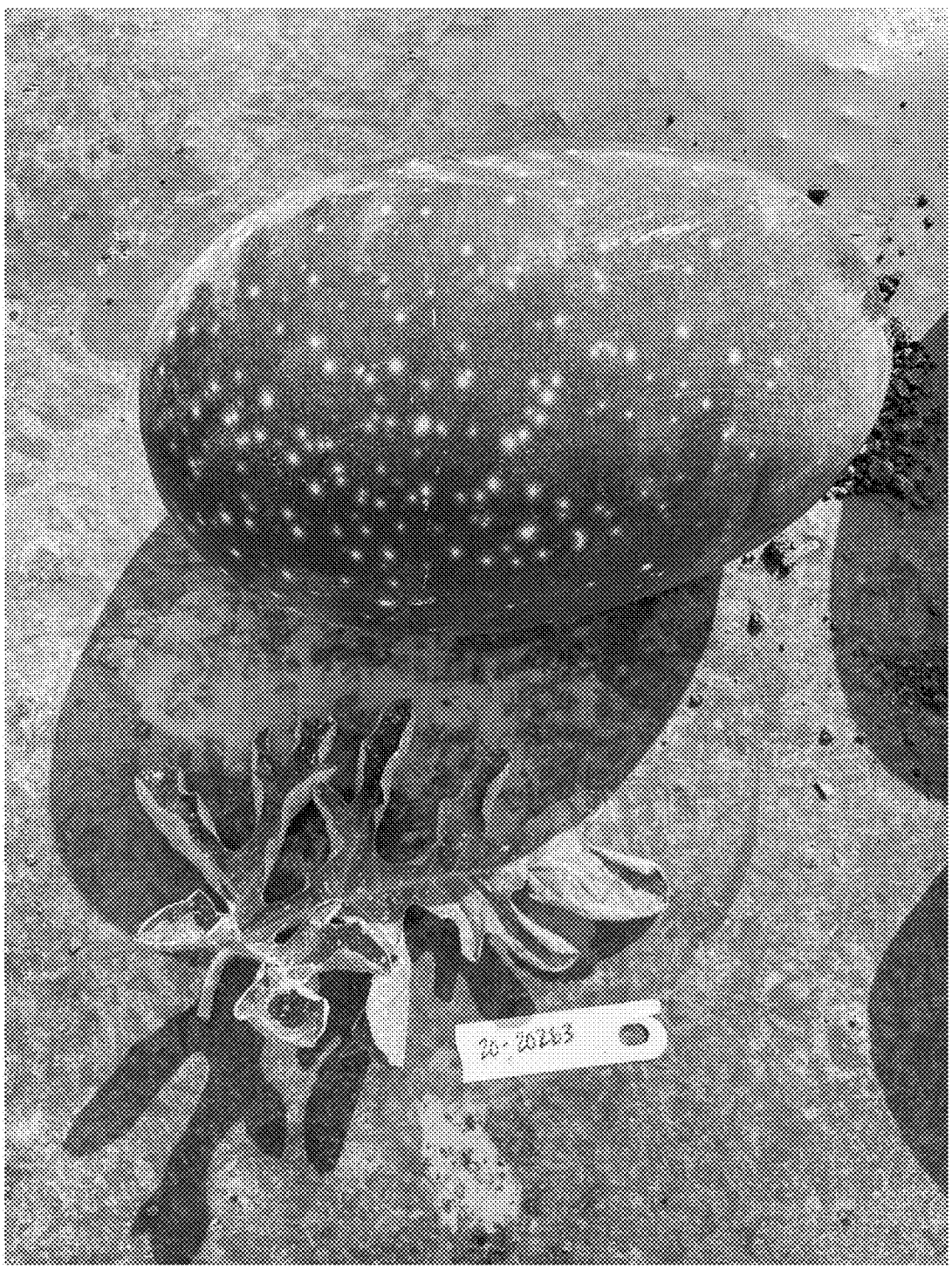
Figure 8:
FIG. 8 shows upper surfaces of leaves (bottom) and a mature fruit (top) of an exemplary triploid watermelon variety with 66% spot allele (i.e., two spot alleles). The fruit rind and the leaves (upper and lower surface) are spotted.

The present invention is also directed toward triploid watermelon varieties with different dosages of spots. FIGS. 7A-7B show exemplary triploid watermelon varieties with 100% spot allele (i.e., three spot alleles), or 100% spotted triploid hybrids. FIG. 8 shows an exemplary triploid watermelon variety with 66% spot allele (i.e., two spot alleles), or a 66% spotted triploid hybrid. For both the 100% spotted and the 66% spotted varieties, the fruit rind and the leaves (upper and lower surface) are spotted.

Figure 5:
FIG. 5 shows cross-sections of a mature fruit showing fruit flesh (left) and fruit rind (right) and leaves of an exemplary diploid watermelon line with 100% spot allele (i.e., two spot alleles). The fruit rind and the leaves (upper and lower surface) are spotted.
Figure 6:
FIG. 6 shows cross-sections of mature fruit showing fruit flesh (bottom left and top right) and fruit rind (bottom right and top left) and leaves of an exemplary tetraploid watermelon line with 100% spot allele (i.e., four spot alleles). The fruit rind and the leaves (upper and lower surface) are spotted.

The present invention is further directed towards diploid and tetraploid varieties and/or lines of watermelon exhibiting the spotted phenotype (e.g., on fruit rind and leaves). FIG. 5 shows an exemplary 100% spotted diploid line, and FIG. 6 shows an exemplary 100% spotted tetraploid line.

The percentage or dosage of the alleles underlying the spotted rind patterning trait is linked to ploidy. For all ploidies (diploid, triploid, and tetraploid), 100% means the allele is homozygously present, and 0% means the allele is absent (i.e., homozygously absent). The number of alleles present, however, varies by ploidy. If "A" is used to designate the spotted allele, and "a" is used to designate the non-spotted allele, a 100% spotted diploid line has two spotted alleles (AA), a 100% spotted triploid line has three spotted alleles (AAA), and a 100% spotted tetraploid line has four spotted alleles (AAAA). For tetraploid lines, 25% means there is one spotted allele present of a possible four (Aaaa), 50% means there are two spotted alleles present (AAaa), and 75% means there are three spotted alleles present (AAAa). For triploid varieties, 33% means there is one spotted allele present of a possible three (Aaa), and 66% means there are two spotted alleles present (AAa). For diploid lines, 50% means there is one spotted allele present of a possible two (i.e., the line is heterozygous; Aa). It is thought that the percentage of the alleles corresponds to the density of the spots, e.g., on leaves, fruit, etc.

There are numerous steps in the development of any novel, desirable plant germplasm. Plant breeding begins with the analysis and definition of problems and weaknesses of the current germplasm, the establishment of program goals, and the definition of specific breeding objectives. The next step is selection of germplasm that possess the traits to meet the program goals. The selected germplasm is crossed in order to recombine the desired traits, and then through selection, varieties or parent lines are developed. The goal is to combine in a single line, variety, or hybrid an improved combination of desirable traits from the parental germplasm. These important traits may include higher yield, field performance, resistance to diseases and insects, and tolerance to drought and heat. These important traits may also include fruit and agronomic quality such as fruit shape, fruit appearance, fruit flesh firmness, and internal quality of fruit.

Choice of breeding or selection methods can depend on the mode of plant reproduction, the heritability of the trait(s) being improved, and the type of cultivar used commercially (e.g., $F_1$ hybrid cultivar, pureline cultivar, etc.). For highly heritable traits, a choice of superior individual plants evaluated at a single location will be effective, whereas for traits with low heritability, selection should be based on mean values obtained from replicated evaluations of families of related plants. Popular selection methods commonly include pedigree selection, modified pedigree selection, mass selection, and recurrent selection.

The complexity of inheritance influences choice of the breeding method. Backcross breeding is used to transfer one or a few favorable genes for a highly heritable trait into a desirable cultivar. This approach has been used extensively for breeding disease-resistant varieties. Various recurrent selection techniques are used to improve quantitatively inherited traits controlled by numerous genes. The use of recurrent selection in self-pollinating crops depends on the ease of pollination, the frequency of successful hybrids from each pollination, and the number of hybrid offspring from each successful cross.

Each breeding program may include a periodic, objective evaluation of the efficiency of the breeding procedure. Evaluation criteria vary depending on the goal and objectives, and can include gain from selection per year based on comparisons to an appropriate standard, overall value of the advanced breeding lines, and number of successful cultivars produced per unit of input (e.g., per year, per dollar expended, etc.).

Promising advanced breeding lines are thoroughly tested and compared to appropriate standards in environments representative of the commercial target area(s) for at least three years. The best lines can then be candidates for new commercial cultivars. Those still deficient in a few traits may be used as parents to produce new populations for further selection. These processes, which lead to the final step of marketing and distribution, may take from ten to twenty years from the time the first cross or selection is made.

One goal of watermelon plant breeding is to develop new, unique, and genetically superior watermelon cultivars and hybrids. A breeder can initially select and cross two or more parental lines, followed by repeated selfing and selection, producing many new genetic combinations. A plant breeder can then select which germplasms to advance to the next generation. These germplasms may then be grown under different geographical, climatic, and soil conditions, and further selections can be made during, and at the end of, the growing season.

The development of commercial watermelon cultivars thus requires the development of watermelon parental lines, the crossing of these lines, and the evaluation of the crosses. Pedigree breeding and recurrent selection breeding methods may be used to develop cultivars from breeding populations. Breeding programs can be used to combine desirable traits from two or more varieties or various broad-based sources into breeding pools from which lines are developed by selfing and selection of desired phenotypes. The new lines are crossed with other lines and the hybrids from these crosses are evaluated to determine which have commercial potential.

Pedigree breeding is generally used for the improvement of self-pollinating crops or inbred lines of cross-pollinating crops. Two parents which possess favorable, complementary traits are crossed to produce an $F_1$. An $F_2$ population is produced by selfing one or several $F_1$s or by intercrossing two $F_1$s (sib mating). Selection of the best individuals is usually begun in the $F_2$ population; then, beginning in the $F_3$, the best individuals in the best families are selected. Replicated testing of families, or hybrid combinations involving individuals of these families, often follows in the $F_4$ generation to improve the effectiveness of selection for traits with low heritability. At an advanced stage of inbreeding (i.e., $F_6$ and $F_7$), the best lines or mixtures of phenotypically similar lines are tested for potential release as new cultivars.

Mass and recurrent selections can be used to improve populations of either self- or cross-pollinating crops. A genetically variable population of heterozygous individuals is either identified or created by intercrossing several different parents. The best plants are selected based on individual superiority, outstanding progeny, or excellent combining ability. The selected plants are intercrossed to produce a new population in which further cycles of selection are continued.

Backcross breeding may be used to transfer genes for a simply inherited, highly heritable trait into a desirable homozygous cultivar or line that is the recurrent parent. The source of the trait to be transferred is called the donor parent. The resulting plant is expected to have the attributes of the recurrent parent (e.g., cultivar) and the desirable trait transferred from the donor parent. After the initial cross, individuals possessing the phenotype of the donor parent are selected and repeatedly crossed (backcrossed) to the recurrent parent. The resulting plant is expected to have the attributes of the recurrent parent (e.g., cultivar) and the desirable trait transferred from the donor parent.

New varieties can also be developed from more than two parents. The technique, known as modified backcrossing, uses different recurrent parents during the backcrossing. Modified backcrossing may be used to replace the original recurrent parent with a variety having certain more desirable characteristics or multiple parents may be used to obtain different desirable characteristics from each.

In addition to being used to create a backcross conversion, backcrossing can also be used in combination with pedigree breeding. As discussed previously, backcrossing can be used to transfer one or more specifically desirable traits from one variety, the donor parent, to a developed variety called the recurrent parent, which has overall good agronomic characteristics yet lacks that desirable trait or traits. However, the same procedure can be used to move the progeny toward the genotype of the recurrent parent, but at the same time retain many components of the nonrecurrent parent by stopping the backcrossing at an early stage and proceeding with selfing and selection. For example, an inbred watermelon line may be crossed with another variety to produce a first generation progeny plant. The first generation progeny plant may then be backcrossed to one of its parent varieties to create a BC1 or BC2. Progeny are selfed and selected so that the newly developed variety has many of the attributes of the recurrent parent and yet several of the desired attributes of the nonrecurrent parent. This approach leverages the value and strengths of the recurrent parent for use in new watermelon varieties.

The single-seed descent procedure in the strict sense refers to planting a segregating population, harvesting a sample of one seed per plant, and using the one-seed sample to plant the next generation. When the population has been advanced from the $F_2$ to the desired level of inbreeding, the plants from which lines are derived will each trace to different $F_2$ individuals. The number of plants in a population declines each generation due to failure of some seeds to germinate or some plants to produce at least one seed. As a result, not all of the $F_2$ plants originally sampled in the population will be represented by a progeny when generation advance is completed.

In addition to phenotypic observations, the genotype of a plant can also be examined. There are many laboratory-based techniques known in the art that are available for the analysis, comparison and characterization of plant genotype. Such techniques include, without limitation, High Resolution Melting (HRM), DNA- or RNA-sequencing, CAPS Markers, ELISA, Western blot, microarrays, Single Nucleotide Polymorphisms (SNPs), Isozyme Electrophoresis, Restriction Fragment Length Polymorphisms (RFLPs), Randomly Amplified Polymorphic DNAs (RAPDs), Arbitrarily Primed Polymerase Chain Reaction (AP-PCR), Differential Display Polymerase Chain Reaction (DD-PCR), Quantitative Real-Time Polymerase Chain Reaction (qRT-PCR), DNA Amplification Fingerprinting (DAF), Sequence Characterized Amplified Regions (SCARs), Amplified Fragment Length Polymorphisms (AFLPs), and Simple Sequence Repeats (SSRs, which are also referred to as Microsatellites).

Molecular markers can also be used during the breeding process for the selection of qualitative traits. For example, markers closely linked to alleles or markers containing sequences within the actual alleles of interest can be used to select plants that contain the alleles of interest during a backcrossing breeding program. The markers can also be used to select toward the genome of the recurrent parent and against the markers of the donor parent. This procedure attempts to minimize the amount of genome from the donor parent that remains in the selected plants. It can also be used to reduce the number of crosses back to the recurrent parent needed in a backcrossing program. The use of molecular markers in the selection process is often called genetic marker enhanced selection or marker-assisted selection.

Molecular markers may also be used to identify and exclude certain sources of germplasm as parental varieties or ancestors of a plant by providing a means of tracking genetic profiles through crosses.

Mutation breeding may also be used to introduce new traits into watermelon varieties. Mutations that occur spontaneously or are artificially induced can be useful sources of variability for a plant breeder. The goal of artificial mutagenesis is to increase the rate of mutation for a desired characteristic. Mutation rates can be increased by many different means including temperature, long-term seed storage, tissue culture conditions, radiation (such as X-rays, Gamma rays, neutrons, Beta radiation, or ultraviolet radiation), chemical mutagens (such as base analogs like 5-bromo-uracil), antibiotics, alkylating agents (such as sulfur mustards, nitrogen mustards, epoxides, ethyleneamines, sulfates, sulfonates, sulfones, or lactones), azide, hydroxylamine, nitrous acid, or acridines. Once a desired trait is observed through mutagenesis the trait may then be incorporated into existing germplasm by traditional breeding techniques. Details of mutation breeding can be found in *Principles of Cultivar Development* by Fehr, Macmillan Publishing Company, 1993.

The production of double haploids can also be used for the development of homozygous varieties in a breeding program. Double haploids are produced by the doubling of a set of chromosomes from a heterozygous plant to produce a completely homozygous individual. For example, see Wan et al., *Theor. Appl. Genet.*, 77:889-892, 1989.

Additional non-limiting examples of breeding methods that may be used include, without limitation, those found in *Principles of Plant Breeding*, John Wiley and Son, pp. 115-161, 1960; Allard, 1960; Simmonds, 1979; Sneep et al., 1979; Fehr, 1987; "Carrots and Related Vegetable Umbelliferae", Rubatzky, V. E., et al., 1999.

Definitions

In the description that follows, a number of terms are used. In order to provide a clear and consistent understanding of the specification and claims, including the scope to be given such terms, the following definitions are provided:

Allele. The allele is any of one or more alternative forms of a gene, all of which relate to one trait or characteristic. In a diploid cell or organism, the two alleles of a given gene occupy corresponding loci on a pair of homologous chromosomes.

Androecious plant. A plant having staminate flowers only.

Backcrossing. Backcrossing is a process in which a breeder repeatedly crosses hybrid progeny back to one of the parents, for example, a first generation hybrid $F_1$ with one of the parental genotype of the $F_1$ hybrid.

Blossom end. The blossom end is the distal end of the fruit (the "far" end as measured from the base of the plant) where the flower blossom is located. The other end of a fruit is the stem end.

Blossom scar. The blossom scar is the small mark left on the distal end of the fruit after the flower falls off.

Covered cultivation. Any type of cultivation where the plants are not exposed to direct sunlight. The covering includes but is not limited to greenhouses, glasshouses, nethouses, plastic houses, and tunnels.

Essentially all the physiological and morphological characteristics. A plant having essentially all the physiological and morphological characteristics means a plant having the physiological and morphological characteristics of the recurrent parent, except for the characteristics derived from the converted gene.

Gene. As used herein, "gene" refers to a segment of nucleic acid. A gene can be introduced into a genome of a species, whether from a different species or from the same species, using transformation or various breeding methods.

Gynoecious plant. A plant having pistillate flowers only.

Monoecious plant. A plant having separate staminate and pistillate flowers on the same plant.

Percent Identity. Percent identity as used herein refers to the comparison of the homozygous alleles of two watermelon lines, hybrids, or varieties. Percent identity is determined by comparing a statistically significant number of the homozygous alleles of two developed varieties, lines or hybrids. For example, a percent identity of 90% between watermelon plant 1 and watermelon plant 2 means that the two plants have the same allele at 90% of their loci.

Percent Similarity. Percent similarity as used herein refers to the comparison of the homozygous alleles of a watermelon plant with another plant. For example, if a homozygous allele of hybrid watermelon 'E26S.00171' matches at least one of the alleles from the other plant then they are scored as similar. Percent similarity is determined by comparing a statistically significant number of loci and recording the number of loci with similar alleles as a percentage. A percent similarity of 90% between hybrid watermelon 'E26S.00171' and another plant means that hybrid watermelon 'E26S.00171' matches at least one of the alleles of the other plant at 90% of the loci.

Pips. Immature white ovules present in fruit produced by triploid watermelon plants.

Propagate. To "propagate" a plant means to reproduce the plant by means including, but not limited to, seeds, cuttings, divisions, tissue culture, embryo culture, or other in vitro method.

Quantitative Trait Loci (QTL). Quantitative trait loci refer to genetic loci that control to some degree numerically representable traits that are usually continuously distributed.

Regeneration. Regeneration refers to the development of a plant from tissue culture.

Seedless. Seedless plants refer to triploid watermelon plants that produce fruit without viable seeds. These fruit may be devoid of seeds or seed-like structures, or may contain immature white ovules.

Single gene converted. Single gene converted or conversion plant refers to plants which are developed by a plant breeding technique called backcrossing wherein essentially all of the desired morphological and physiological characteristics of an inbred are recovered in addition to the single gene transferred into the inbred via the backcrossing technique, genetic engineering, or mutation.

Transgene. A "transgene" is a gene taken or copied from one organism and inserted into another organism. A transgene may be a gene that is foreign to the receiving organism or it may be a modified version of a native, or endogenous, gene.

Overview of the hybrid 'E26S.00171'

Watermelon hybrid 'E26S.00171' is a triploid hybrid that produces fruit with a spotted rind pattern and vivid red flesh color. FIG. 1A shows whole fruit of watermelon hybrid 'E26S.00171', FIG. 1B shows longitudinal cross-sections of fruit of watermelon hybrid 'E26S.00171', FIG. 1C shows the upper side of a leaf with spots of watermelon hybrid 'E26S.00171', FIG. 1D shows the lower side of a leaf with spots of watermelon hybrid 'E26S.00171', FIG. 1E shows a female flower with a spot of watermelon hybrid 'E26S.00171', FIG. 1F shows a female flower of watermelon hybrid 'E26S.00171', FIG. 1G shows a male flower of watermelon hybrid 'E26S.00171', FIG. 1H shows an immature fruit with a spot of watermelon hybrid 'E26S.00171', and FIG. 1I shows a plant with spots of watermelon hybrid 'E26S.00171'. Watermelon hybrid 'E26S.00171' is the result of numerous generations of plant selections chosen for its rind appearance; vivid red color and firmness of its flesh; and very low incidence of hollow heart.

The hybrid has shown uniformity and stability for the traits, within the limits of environmental influence for the traits. No variant traits have been observed or are expected in 'E26S.00171'.

Objective Description of the Hybrid 'E26S.00171'

Figure 2:
FIG. 2 shows fruit of watermelon variety 'Harvest Moon' (U.S. Pat. No. 9,545,065).
Figure 3A:
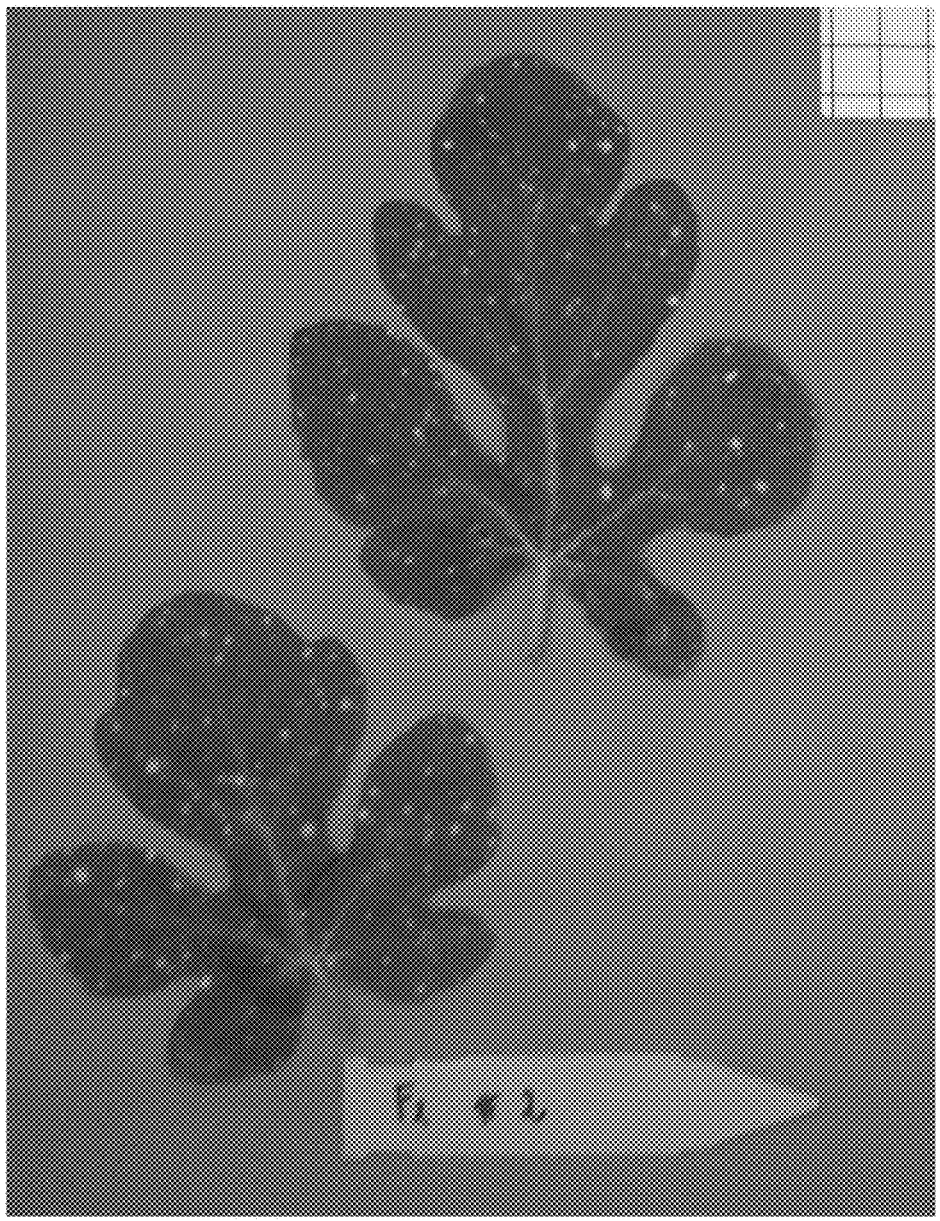
FIGS. 3A-3H show spotted phenotypes on leaves of the diploid F2 population used for mapping.
Figure 3B:
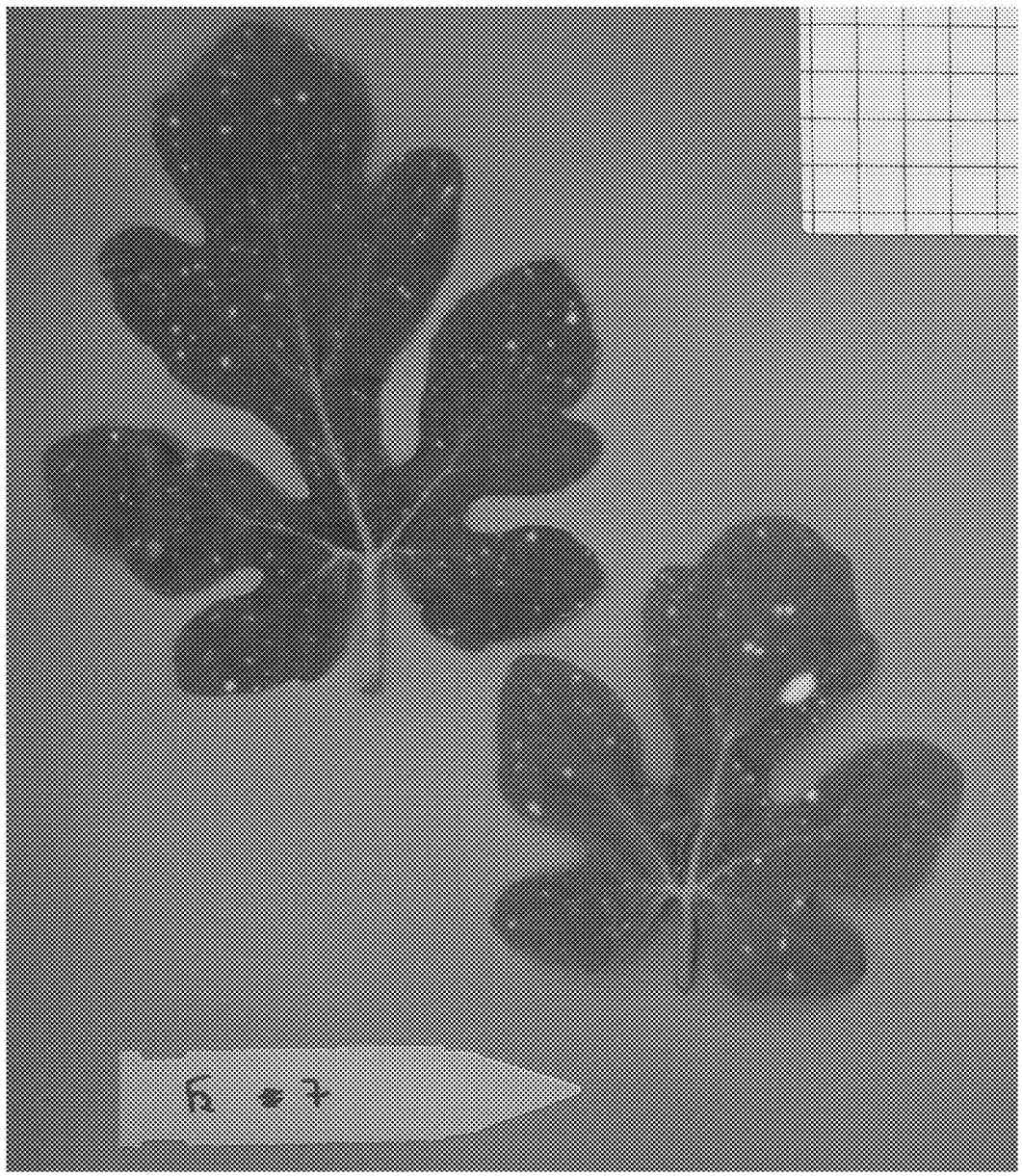
Figure 3C:
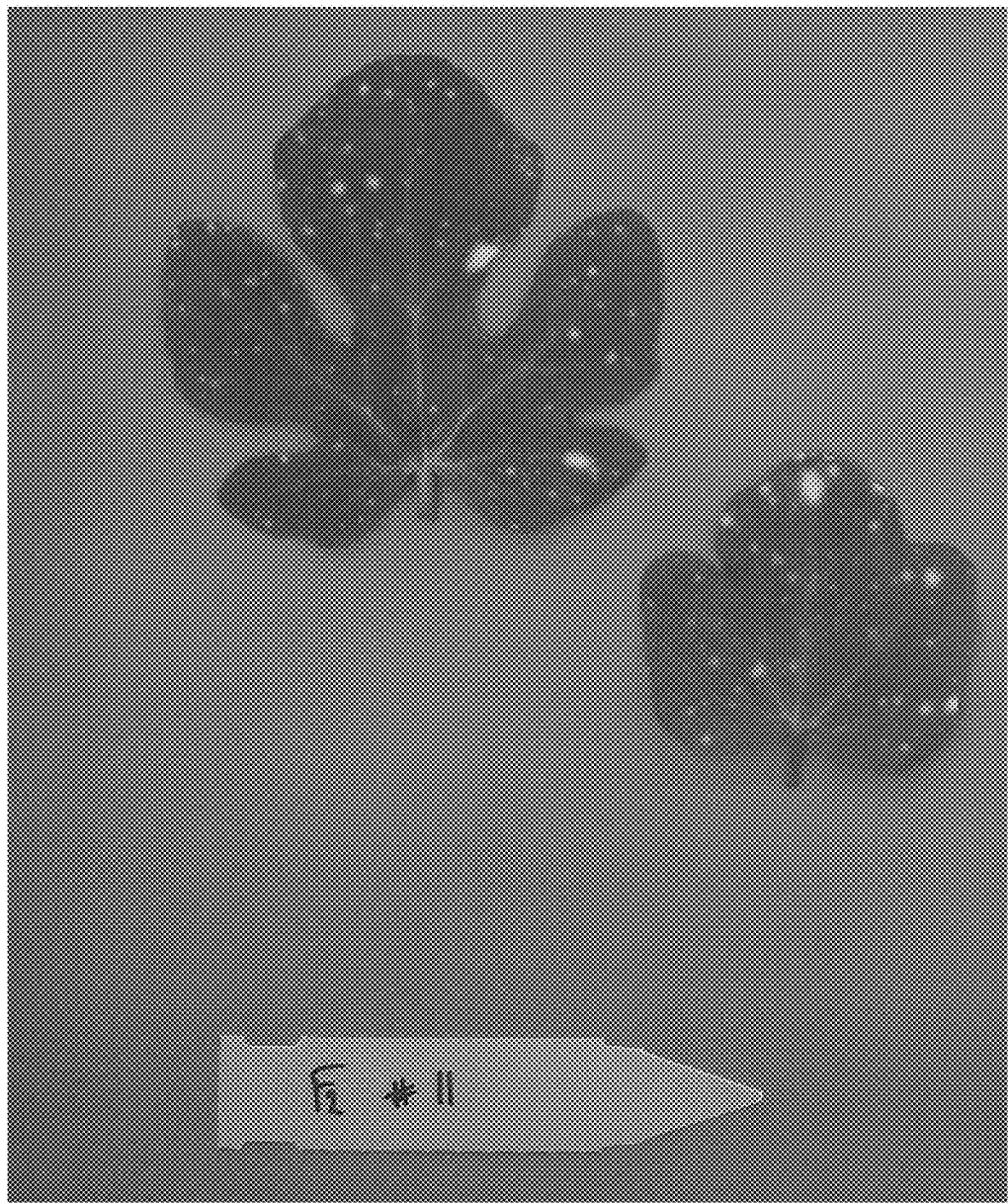
Figure 3D:
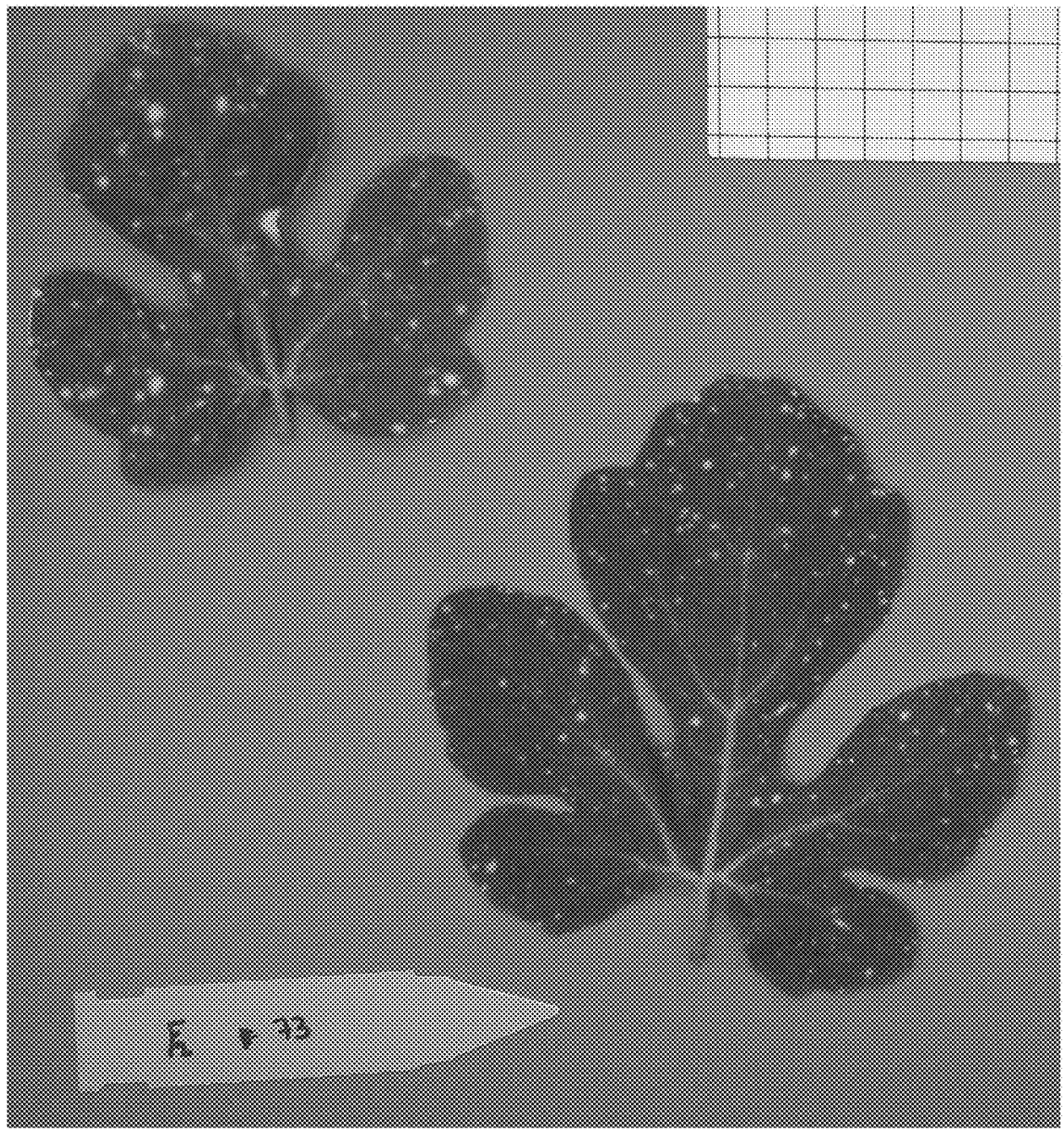
Figure 3E:
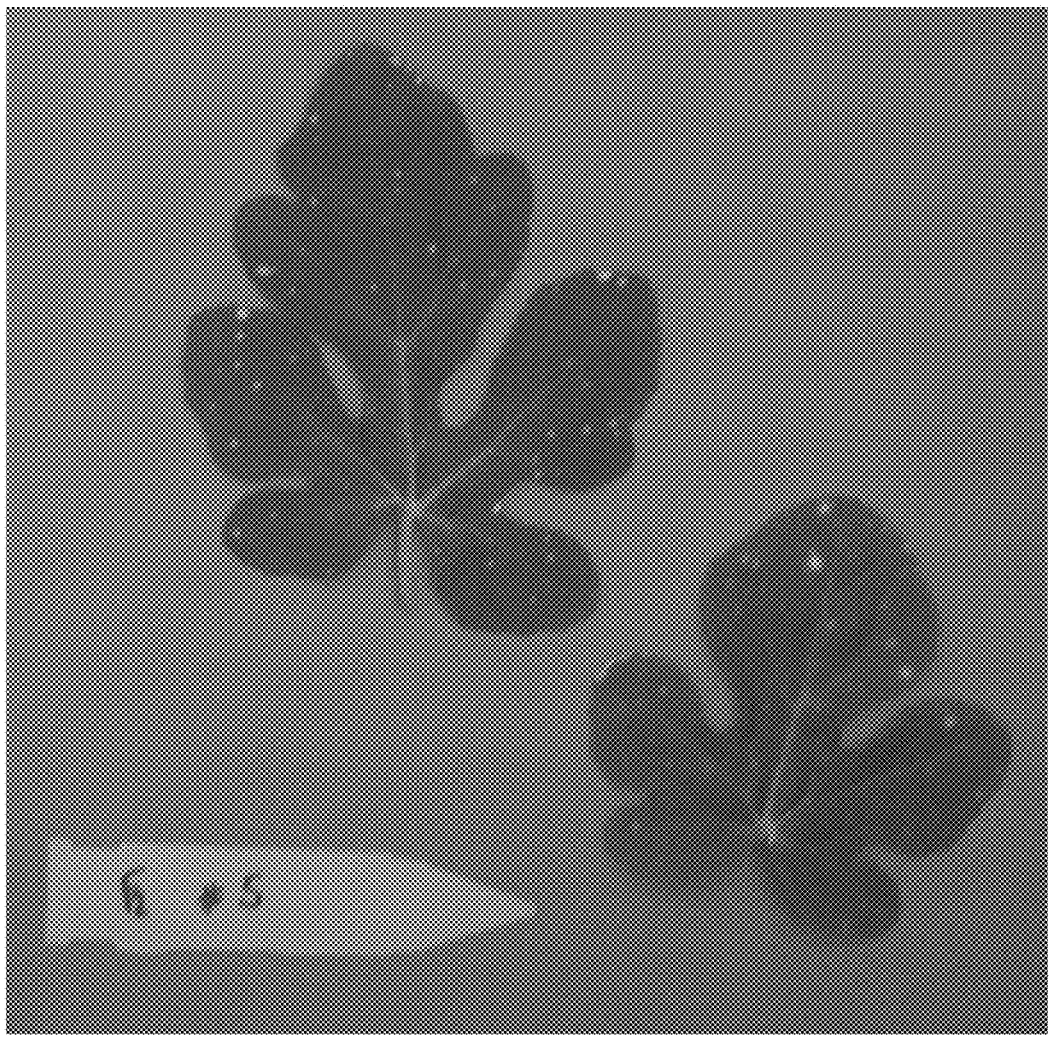
Figure 3F:
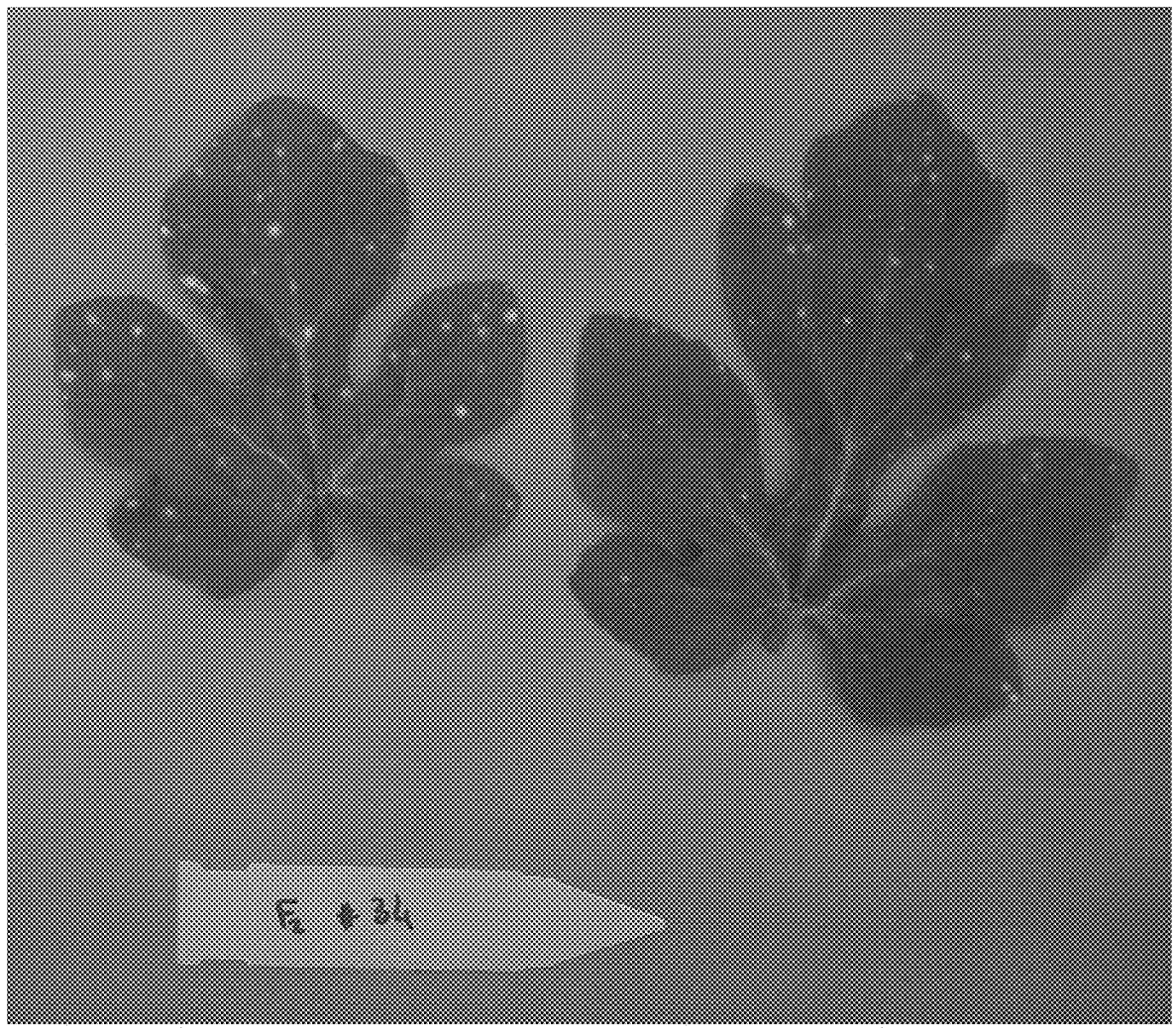
Figure 3G:
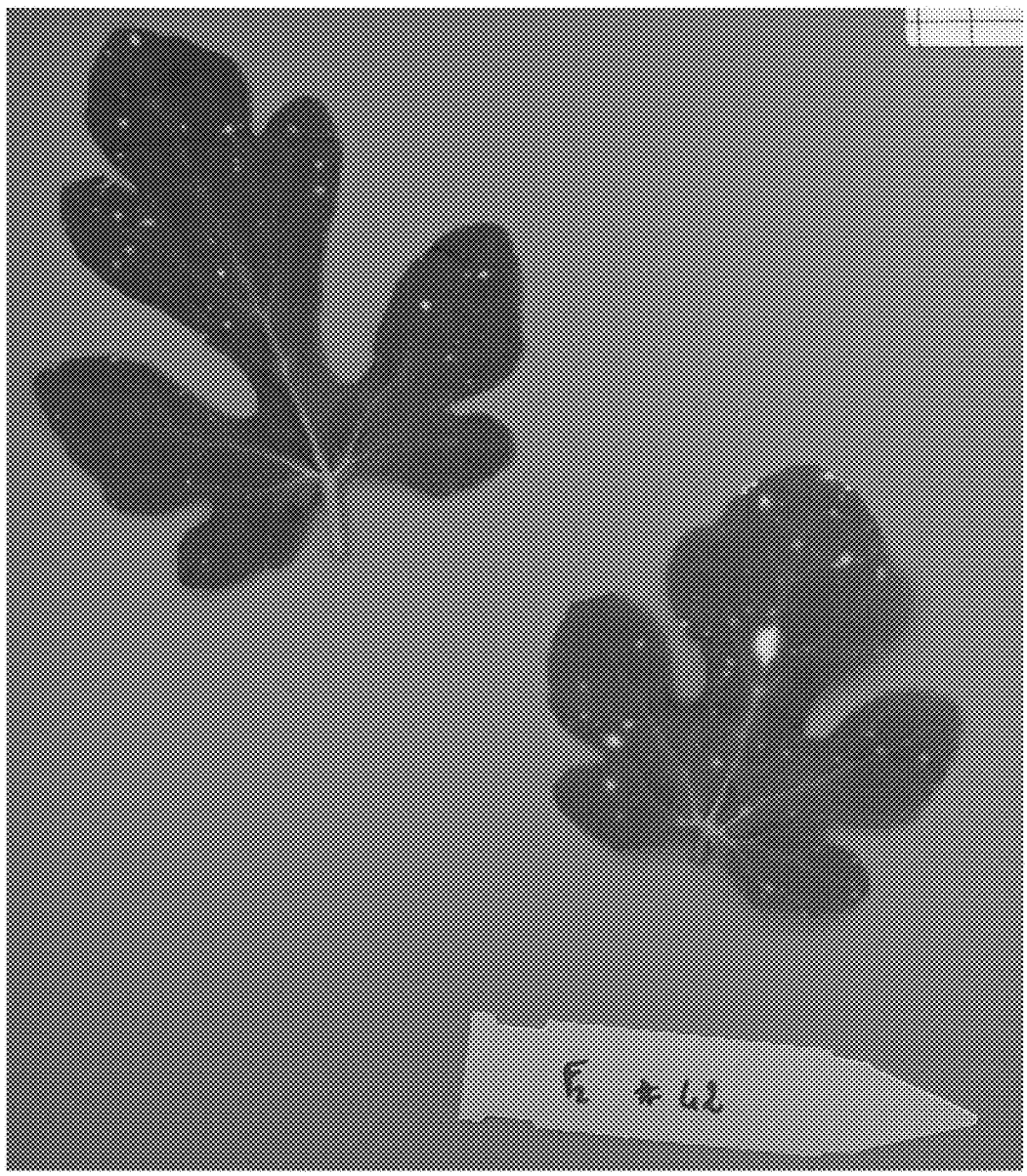
Figure 3H:
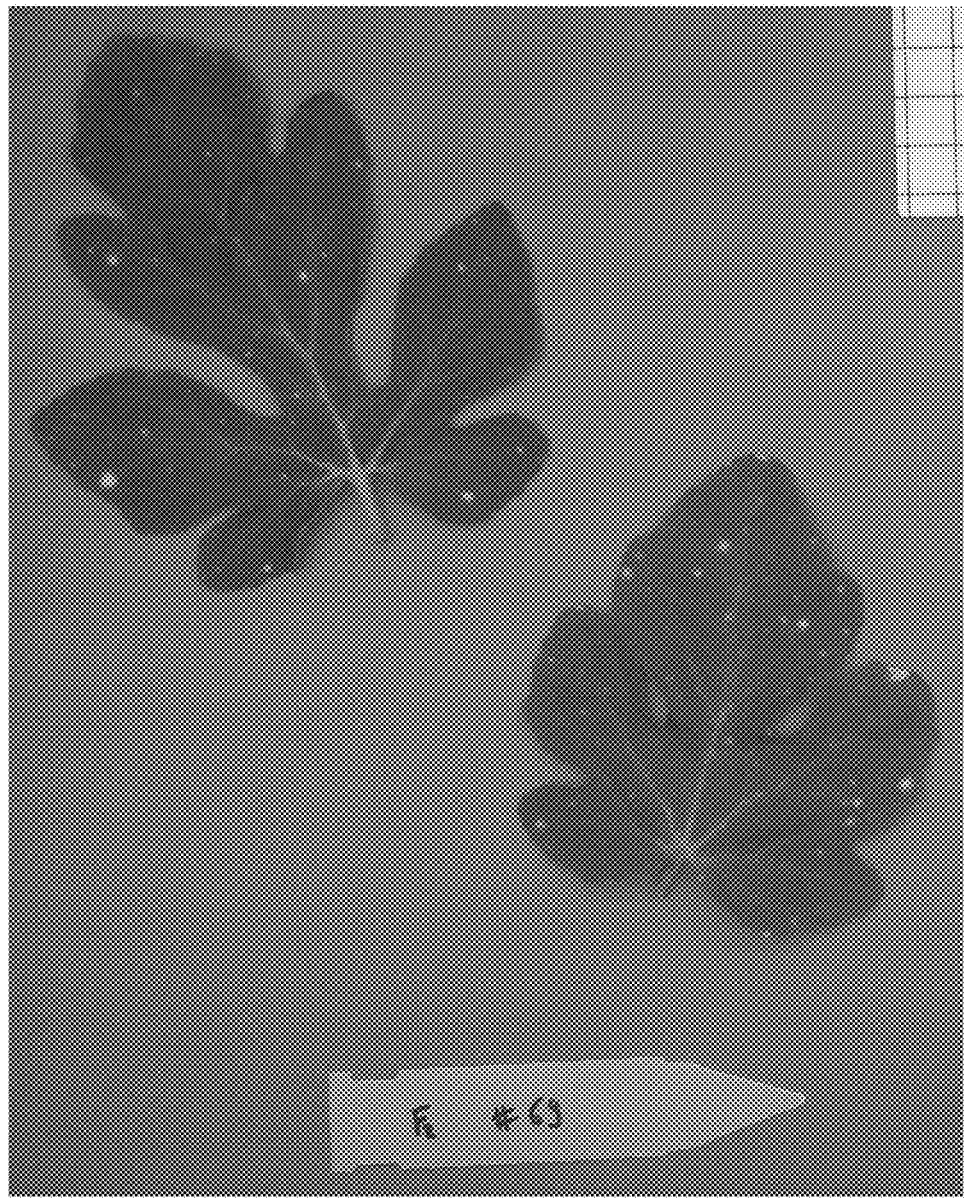

Watermelon hybrid 'E26S.00171' has the following morphologic and other characteristics:
  General fruit type: Round-Oval
  Type of culture: In the open
  Ploidy: Triploid
  Plant:
  Color: Green
  Pattern: Spots
  Color of pattern: Yellow
  Immature fruit:
  Skin color: Lighter green
  Skin pattern: Spots sometimes show at immature stage, and sometimes are not visible until the fruit is more mature
  Color of skin pattern: Yellow
  Mature fruit:
  Shape: Round
  Length: 27 cm
  Width: 25 cm
  Length/width ratio: 1.08
  Skin color: Peacock green
  Skin pattern: Spots
  Skin pattern color: Yellow
  Spot size: Majority are <2 cm in diameter; range from 0.2 cm to 15 cm in diameter
  Rind:
  Thickness of sides: 1.2 cm
  Flesh:
  Texture: Firm-crisp
  Color: RHS 46B (Vivid red)
  Color intensity: 7 (1-9 scale, where 1 is less intense and 9 is most intense)
  Taste: 6 (1-9 scale, where 1 is less sweet and 9 is most sweet)
  Hollow heart: Low
  Pips:
  Size: Medium-large
Comparisons to Other Watermelon Varieties Table 1 below compares some of the characteristics of the triploid hybrid 'E26S.00171' with the triploid hybrid 'Harvest Moon' (U.S. Pat. No. 9,545,065). Column 1 lists the characteristic, column 2 shows the characteristics for triploid hybrid 'E26S.00171', and column 3 shows the characteristics for comparison triploid hybrid 'Harvest Moon'. Both 'E26S.00171' and 'Harvest Moon' have medium-large pip size. Additional distinguishing characteristics can be determined from the comparison of FIGS. 1A-1I ('E26S.00171') and FIG. 2 ('Harvest Moon').

TABLE 1

Comparison of 'E26S.00171' and 'Harvest Moon'.

| Characteristic | 'E26S.00171' | 'Harvest Moon' |
| --- | --- | --- |
| Fruit length | 27 cm | 33 cm |
| Fruit width | 25 cm | 28 cm |
| Length/width ratio | 1.08 | 1.17 |
| Rind thickness | 1.2 cm | 1.3 cm |
| Fruit flesh color | RHS 46B (Vivid red) | RHS 53C (Strong red) |
| Fruit flesh color intensity[1] | 7 | 5 |
| Fruit flesh taste[2] | 6 | 5 |
| Fruit flesh firmness | Firm-crisp | Crisp |
| Hollow heart | Low | Medium |

[1] 1-9 scale, where 1 is less intense and 9 is most intense
[2] 1-9 scale where 1 is less sweet and 9 is most sweet

FURTHER EMBODIMENTS

In one aspect, the present invention is directed to methods of producing a homozygous-spotted diploid watermelon line (HSDL), including: (a) crossing a first diploid watermelon plant with a spotted trait with a second diploid watermelon plant without the spotted trait to produce progeny watermelon seed, wherein the presence of the spotted trait is determined by visually phenotyping for the spotted trait or by genotyping to identify a presence of a marker linked to a spotted allele, wherein the spotted allele is located between position 134886 and position 86340 on Chromosome 4 of a 'Charleston Gray' genome; (b) crossing a watermelon plant grown from the progeny watermelon seed with itself or a second watermelon plant to produce additional progeny watermelon seed; (c) planting the additional progeny watermelon seed of step (b) to produce additional watermelon plants; (d) selecting watermelon plants with the spotted trait from the additional watermelon plants of step (c); (e) repeating the crossing of step (b), the planting of step (c), and the selecting of step (d) for an additional 3-10 generations to produce a homozygous-spotted diploid watermelon line (HSDL), wherein the HSDL is 100% spotted (i.e., homozygous for the spotted allele). In one embodiment, the first diploid plant of step (a) is homozygous for the spotted allele or heterozygous for the spotted allele. Another embodiment, which may be combined with any of the preceding embodiments, further includes selecting one or more additional traits of interest at step (c), wherein the one or more additional traits of interest are selected from the group of a fruit flesh color trait, a fruit flesh firmness trait, or a fruit taste trait. In a further embodiment, visual phenotyping includes looking at the leaves and/or fruit of the plant and scoring for presence or absence of spots. In another embodiment, the marker includes a first marker including a T at position 101 of SEQ ID NO: 1 and/or a second marker including a G at position 101 of SEQ ID NO: 6. In a further embodiment, genotyping of the first marker includes the use of a forward primer including SEQ ID NO: 3, a reverse primer including SEQ ID NO: 4, and/or a probe including SEQ ID NO: 5, and genotyping of the second marker includes the use of a forward primer including SEQ ID NO: 8, a reverse primer including SEQ ID NO: 9, and/or a probe including SEQ ID NO: 10. The marker may be used to determine the percentage of the spotted allele, as described in Example 1.

Some embodiments of the present invention are directed to the HSDL plant produced by the method of any of the preceding embodiments. The HSDL plant of the present invention may have the additional traits of fruit flesh color (e.g., a dark red fruit flesh color), fruit flesh firmness (e.g., medium-firm fruit flesh), and fruit taste (e.g., a sweet taste). Watermelon plant parts include watermelon leaves, ovules, pollen, seeds, watermelon fruits, parts of watermelon fruits, flowers, cells, and the like. In another embodiment, the present invention is further directed to watermelon leaves, ovules, pollen, seeds, watermelon fruits, parts of watermelon fruits, and/or flowers isolated from HSDL watermelon plants. In another embodiment, the present invention is further directed to protoplasts produced from HSDL watermelon plants. In another embodiment, the present invention is further directed to tissue culture of HSDL watermelon plants, and to watermelon plants regenerated from the tissue culture, where the plant has all of the morphological and physiological characteristics of HSDL watermelon. In certain embodiments, tissue culture of HSDL watermelon plants is produced from a plant part selected from leaf, anther, pistil, stem, petiole, root, root tip, fruit, seed, flower, cotyledon, hypocotyl, embryo, and meristematic cell.

Further embodiments of the present invention are directed to methods of producing a homozygous-spotted tetraploid watermelon line (HSTL), including: (a) doubling a chromosome number of the HSDL plant of claim 5, thereby producing a homozygous-spotted tetraploid watermelon line (HSTL), wherein the HSTL is 100% spotted (i.e., homozygous for the spotted allele). The HSTL plant of the present invention may have the additional traits of fruit flesh color (e.g., a dark red fruit flesh color), fruit flesh firmness (e.g., medium-firm fruit flesh), and fruit taste (e.g., a sweet taste). Watermelon plant parts include watermelon leaves, ovules, pollen, seeds, watermelon fruits, parts of watermelon fruits, flowers, cells, and the like. In another embodiment, the present invention is further directed to watermelon leaves, ovules, pollen, seeds, watermelon fruits, parts of watermelon fruits, and/or flowers isolated from HSTL watermelon plants. In another embodiment, the present invention is further directed to protoplasts produced from HSTL watermelon plants. In another embodiment, the present invention is further directed to tissue culture of HSTL watermelon plants, and to watermelon plants regenerated from the tissue culture, where the plant has all of the morphological and physiological characteristics of HSTL watermelon. In certain embodiments, tissue culture of HSTL watermelon plants is produced from a plant part selected from leaf, anther, pistil, stem, petiole, root, root tip, fruit, seed, flower, cotyledon, hypocotyl, embryo, and meristematic cell.

Additional embodiments of the present invention are directed to methods of producing a 33% spotted triploid hybrid watermelon plant, including: (a) crossing the HSDL plant of claim 5 onto a 0% spotted tetraploid inbred plant, wherein the HSDL plant is a male parent and the tetraploid inbred plant is a female parent, to produce a 33% spotted triploid hybrid watermelon plant. Some embodiments of the present invention are directed to the 33% spotted triploid hybrid watermelon plant produced by the method of the preceding embodiment. The 33% spotted triploid hybrid watermelon plant of the present invention may have the additional traits of fruit flesh color (e.g., a dark red fruit flesh color), fruit flesh firmness (e.g., medium-firm fruit flesh), and fruit taste (e.g., a sweet taste). Watermelon plant parts include watermelon leaves, ovules, pollen, seeds, watermelon fruits, parts of watermelon fruits, flowers, cells, and the like. In another embodiment, the present invention is further directed to watermelon leaves, ovules, pollen, seeds, watermelon fruits, parts of watermelon fruits, and/or flowers isolated from 33% spotted triploid hybrid watermelon plants. In another embodiment, the present invention is further directed to protoplasts produced from 33% spotted triploid hybrid watermelon plants. In another embodiment, the present invention is further directed to tissue culture of 33% spotted triploid hybrid watermelon plants, and to watermelon plants regenerated from the tissue culture, where the plant has all of the morphological and physiological characteristics of 33% spotted triploid hybrid watermelon plants. In certain embodiments, tissue culture of 33% spotted triploid hybrid watermelon plants is produced from a plant part selected from leaf, anther, pistil, stem, petiole, root, root tip, fruit, seed, flower, cotyledon, hypocotyl, embryo, and meristematic cell.

Yet further embodiments of the present invention are directed to methods of producing a 50% or 100% spotted diploid hybrid watermelon plant, including: (a) crossing the HSDL plant of claim 5 onto a 0% spotted diploid inbred plant or onto a second HSDL plant of claim 5, thereby producing a 50% or 100% spotted diploid hybrid watermelon plant. Some embodiments of the present invention are directed to the 50% or 100% spotted diploid hybrid watermelon plant produced by the method of the preceding embodiment. The 50% or 100% spotted diploid hybrid watermelon plant of the present invention may have the additional traits of fruit flesh color (e.g., a dark red fruit flesh color), fruit flesh firmness (e.g., medium-firm fruit flesh), and fruit taste (e.g., a sweet taste). Watermelon plant parts include watermelon leaves, ovules, pollen, seeds, watermelon fruits, parts of watermelon fruits, flowers, cells, and the like. In another embodiment, the present invention is further directed to watermelon leaves, ovules, pollen, seeds, watermelon fruits, parts of watermelon fruits, and/or flowers isolated from 50% or 100% spotted diploid hybrid watermelon plants. In another embodiment, the present invention is further directed to protoplasts produced from 50% or 100% spotted diploid hybrid watermelon plants. In another embodiment, the present invention is further directed to tissue culture of 50% or 100% spotted diploid hybrid watermelon plants, and to watermelon plants regenerated from the tissue culture, where the plant has all of the morphological and physiological characteristics of 50% or 100% spotted diploid hybrid watermelon plants. In certain embodiments, tissue culture of 50% or 100% spotted diploid hybrid watermelon plants is produced from a plant part selected from leaf, anther, pistil, stem, petiole, root, root tip, fruit, seed, flower, cotyledon, hypocotyl, embryo, and meristematic cell.

In another aspect, the present invention is directed to methods of producing a homozygous-spotted tetraploid watermelon line (HSTL), including: (a) providing a diploid watermelon plant with a spotted trait, wherein the presence of the spotted trait is determined by visually phenotyping for the spotted trait or by genotyping to identify a presence of a marker linked to a spotted allele, and wherein the spotted allele is located between position 134886 and position 86340 on Chromosome 4 of a 'Charleston Gray' genome; (b) doubling a chromosome number of the diploid watermelon plant to produce a tetraploid watermelon plant with the spotted trait; (c) crossing the tetraploid watermelon plant with a non-spotted watermelon plant to produce a F1 generation of watermelon plants; (d) self-pollinating or open pollinating the F1 generation of watermelon plants to produce a F2 generation of watermelon plants; (e) phenotyping progeny watermelon plants from the F2 generation to identify the presence of the spotted trait and/or genotyping progeny watermelon plants from the F2 generation to identify the presence of the marker linked to the spotted allele and using the marker to determine a dosage of the spotted allele; (f) selecting progeny watermelon plants with the highest dosage of the spotted allele; (g) repeating the self-pollinating of step (d), the genotyping of step (e), and the selecting of step (f) for an additional 3-10 generations to produce a homozygous-spotted tetraploid watermelon line (HSTL), wherein the HSTL is 100% spotted (i.e., homozygous for the spotted allele). In one embodiment, the tetraploid plant of step (b) is homozygous for the spotted allele or heterozygous for the spotted allele. In a further embodiment, visual phenotyping or phenotyping includes looking at the leaves and/or fruit of the plant and scoring for presence or absence of spots. In another embodiment, the marker includes a first marker including a T at position 101 of SEQ ID NO: 1 and/or a second marker including a G at position 101 of SEQ ID NO: 6. In a further embodiment, genotyping of the first marker includes the use of a forward primer including SEQ ID NO: 3, a reverse primer including SEQ ID NO: 4, and/or a probe including SEQ ID NO: 5, and wherein genotyping of the second marker includes the use of a forward primer including SEQ ID NO: 8, a reverse primer including SEQ ID NO: 9, and/or a probe including SEQ ID NO: 10. The marker may be used to determine the percentage of the spotted allele, as described in Example 1.

Some embodiments of the present invention are directed to the HSTL plant produced by the method of any of the preceding embodiments. The HSTL plant of the present invention may have the additional traits of fruit flesh color (e.g., a dark red fruit flesh color), fruit flesh firmness (e.g., medium-firm fruit flesh), and fruit taste (e.g., a sweet taste). Watermelon plant parts include watermelon leaves, ovules, pollen, seeds, watermelon fruits, parts of watermelon fruits, flowers, cells, and the like. In another embodiment, the present invention is further directed to watermelon leaves, ovules, pollen, seeds, watermelon fruits, parts of watermelon fruits, and/or flowers isolated from HSTL watermelon plants. In another embodiment, the present invention is further directed to protoplasts produced from HSTL watermelon plants. In another embodiment, the present invention is further directed to tissue culture of HSTL watermelon plants, and to watermelon plants regenerated from the tissue culture, where the plant has all of the morphological and physiological characteristics of HSTL watermelon. In certain embodiments, tissue culture of HSTL watermelon plants is produced from a plant part selected from leaf, anther, pistil, stem, petiole, root, root tip, fruit, seed, flower, cotyledon, hypocotyl, embryo, and meristematic cell.

Additional embodiments of the present invention are directed to methods of producing a 66% spotted triploid hybrid watermelon plant, including: (a) crossing the HSTL plant of claim 13 onto a 0% spotted diploid inbred plant, wherein the HSTL plant is a female parent and the diploid inbred plant is a male parent, to produce a 66% spotted triploid hybrid watermelon plant. Some embodiments of the present invention are directed to the 66% spotted triploid hybrid watermelon plant produced by the method of the preceding embodiment. The 66% spotted triploid hybrid watermelon plant of the present invention may have the additional traits of fruit flesh color (e.g., a dark red fruit flesh color), fruit flesh firmness (e.g., medium-firm fruit flesh), and fruit taste (e.g., a sweet taste). Watermelon plant parts include watermelon leaves, ovules, pollen, seeds, watermelon fruits, parts of watermelon fruits, flowers, cells, and the like. In another embodiment, the present invention is further directed to watermelon leaves, ovules, pollen, seeds, watermelon fruits, parts of watermelon fruits, and/or flowers isolated from 66% spotted triploid hybrid watermelon plants. In another embodiment, the present invention is further directed to protoplasts produced from 66% spotted triploid hybrid watermelon plants. In another embodiment, the present invention is further directed to tissue culture of 66% spotted triploid hybrid watermelon plants, and to watermelon plants regenerated from the tissue culture, where the plant has all of the morphological and physiological characteristics of 66% spotted triploid hybrid watermelon plants. In certain embodiments, tissue culture of 66% spotted triploid hybrid watermelon plants is produced from a plant part selected from leaf, anther, pistil, stem, petiole, root, root tip, fruit, seed, flower, cotyledon, hypocotyl, embryo, and meristematic cell.

Further embodiments of the present invention are directed to methods of producing a 100% spotted triploid hybrid watermelon plant, including: (a) crossing the HSDL plant of claim 5 with the HSTL plant of claim 13 to produce a 100% spotted triploid hybrid watermelon plant. Some embodiments of the present invention are directed to the 100% spotted triploid hybrid watermelon plant produced by the method of the preceding embodiment. The 100% spotted triploid hybrid watermelon plant of the present invention may have the additional traits of fruit flesh color (e.g., a dark red fruit flesh color), fruit flesh firmness (e.g., medium-firm fruit flesh), and fruit taste (e.g., a sweet taste). Watermelon plant parts include watermelon leaves, ovules, pollen, seeds, watermelon fruits, parts of watermelon fruits, flowers, cells, and the like. In another embodiment, the present invention is further directed to watermelon leaves, ovules, pollen, seeds, watermelon fruits, parts of watermelon fruits, and/or flowers isolated from 100% spotted triploid hybrid watermelon plants. In another embodiment, the present invention is further directed to protoplasts produced from 100% spotted triploid hybrid watermelon plants. In another embodiment, the present invention is further directed to tissue culture of 100% spotted triploid hybrid watermelon plants, and to watermelon plants regenerated from the tissue culture, where the plant has all of the morphological and physiological characteristics of 100% spotted triploid hybrid watermelon plants. In certain embodiments, tissue culture of 100% spotted triploid hybrid watermelon plants is produced from a plant part selected from leaf, anther, pistil, stem, petiole, root, root tip, fruit, seed, flower, cotyledon, hypocotyl, embryo, and meristematic cell.

In yet another aspect, the present invention is directed to methods of selecting a spotted watermelon plant, including: (a) crossing a spotted watermelon plant to a watermelon plant to produce a population of progeny watermelon plants; (b) genotyping the population of progeny watermelon plants for a presence of a marker linked to a spotted allele, wherein the spotted allele is located between position 134886 and position 86340 on Chromosome 4 of a 'Charleston Gray' genome; and (c) selecting a progeny plant on the basis of the presence of the one or more sequences genotyped in (b), wherein the progeny watermelon plant is spotted. In one embodiment, the marker includes a first marker including a T at position 101 of SEQ ID NO: 1 (or a T at position 61 of SEQ ID NO: 2) and/or a second marker including a G at position 101 of SEQ ID NO: 6 (or a G at position 61 of SEQ ID NO: 7), and wherein genotyping of the first marker includes the use of a forward primer including SEQ ID NO: 3, a reverse primer including SEQ ID NO: 4, and/or a probe including SEQ ID NO: 5, and wherein genotyping of the second marker includes the use of a forward primer including SEQ ID NO: 8, a reverse primer including SEQ ID NO: 9, and/or a probe including SEQ ID NO: 10. The marker may be used to determine the percentage of the spotted allele, as described in Example 1.

In still another aspect, the present invention is directed to methods of selecting a spotted watermelon plant, including: (a) providing a test spotted watermelon plant and a control spotted watermelon plant; (b) using a PCR-based technique to assess the presence of one or more sequences selected from the group of a sequence including T at position 101 of SEQ ID NO: 1 (or a T at position 61 of SEQ ID NO: 2) or a sequence including a G at position 101 of SEQ ID NO: 6 (or a G at position 61 of SEQ ID NO: 7); and (c) determining the percentage of the spotted allele in the test spotted watermelon plant based on a comparison between the results of step (b) for the test spotted watermelon plant and the control spotted watermelon plant. In one embodiment, the PCR-based technique of step (b) includes the use of primers and probes selected from the group of SEQ ID NO: 3, SEQ ID NO: 4, SEQ ID NO: 5, SEQ ID NO: 8, SEQ ID NO: 9, or SEQ ID NO: 10. The PCR-based technique may be any known PCR-based technique. When high resolution melting (HRM) is used, the curve obtained from the test spotted watermelon plant is compared to the curve obtained from the control spotted watermelon plant (e.g., a diploid F1 with 50% spotting). Further, the order of curves shown in FIG. 4 may be used to determine the percentage of the spotted allele in the test spotted watermelon plant. In a further embodiment, the PCR-based technique of step (b) is replaced with a sequencing-based technique.

Occasionally, triploid watermelon varieties produce true and viable seed at a very low frequency. This is due to the random segregation of chromosomes, which can result in chromosomes occasionally ending up distributed back to normal in the ovule and pollen such that they are balanced enough to be viable. Thus, occasional viable pollen from a triploid variety can be "bridged", or crossed, onto a normal diploid or tetraploid line to make viable hybrid seed. Similarly, occasional viable ovules within a triploid can be bridged or crossed onto, using pollen from a normal tetraploid or diploid line to create viable seed. Also occasionally, a triploid within and of itself can make a viable seed that can make a fertile plant. This occasional fertility of triploid varieties is well-known by watermelon breeders, and can be taken advantage of to incorporate triploid varieties with desirable characteristics into breeding programs. Watermelon variety 'E26S.00171', like other triploid varieties, occasionally produces flowers with viable pollen or viable ovules. Similarly, watermelon variety 'E26S.00171' occasionally produces fruit containing viable, fertile seed. An additional aspect of this disclosure is directed to methods for producing offspring of watermelon variety 'E26S.00171' (e.g., using viable pollen, viable ovules, or viable seed occasionally produced by 'E26S.00171').

As used herein, the term plant includes plant cells, plant protoplasts, plant cell tissue cultures from which watermelon plants can be regenerated, plant calli, plant clumps and plant cells that are intact in plants or parts of plants, such as embryos, pollen (pollen grains), ovules, flowers, leaves, stems, and the like.

Genetic Marker Profile

In addition to phenotypic observations, a plant can also be identified by its genotype. The genotype of a plant can be characterized through a genetic marker profile which can identify plants of the same or a related variety or line, or can be used to determine or validate a pedigree. Genetic marker profiles can be obtained by techniques such as Restriction Fragment Length Polymorphisms (RFLPs), Randomly Amplified Polymorphic DNAs (RAPDs), Arbitrarily Primed Polymerase Chain Reaction (AP-PCR), DNA Amplification Fingerprinting (DAF), Sequence Characterized Amplified Regions (SCARs), Amplified Fragment Length Polymorphisms (AFLPs), Simple Sequence Repeats (SSRs) which are also referred to as Microsatellites, and Single Nucleotide Polymorphisms (SNPs). For example, see Cregan et al., "An Integrated Genetic Linkage Map of the Soybean Genome" Crop Science 39:1464-1490 (1999), and Berry et al., "Assessing Probability of Ancestry Using Simple Sequence Repeat Profiles: Applications to Maize Inbred Lines and Soybean Varieties" Genetics 165:331-342 (2003).

Particular markers used for these purposes are not limited to any particular set of markers, but are envisioned to include any type of marker and marker profile which provides a means of distinguishing varieties.

Differentially-inherited nucleic acid polymorphisms that segregate among progeny may be used as molecular markers. The polymorphisms can be of any origin, including insertions, deletions, duplications, repetitive elements, point mutations, recombination events, and transposable elements. Means of characterizing genetic marker profiles using any of the above techniques are well known in the art.

The present invention includes markers for a spotted trait. Further provided by the invention is a watermelon plant characterized by molecular and physiological data obtained from the representative sample of said line deposited with the National Collection of Industrial, Food and Marine Bacteria Ltd. (NCIMB Ltd.). In addition, the present invention includes a watermelon plant formed by the combination of the disclosed watermelon plant or plant cell with another watermelon plant or cell and including the homozygous alleles of the line.

Single-Gene Conversions

When the terms watermelon plant, cultivar, hybrid, or watermelon line are used in the context of the present invention, this also includes any single gene conversions of that line. The term "single gene converted plant" as used herein refers to those watermelon plants which are developed by a plant breeding technique called backcrossing wherein essentially all of the desired morphological and physiological characteristics of a cultivar are recovered in addition to the single gene transferred into the line via the backcrossing technique. Backcrossing methods can be used with the present invention to improve or introduce a characteristic into the line. The term "backcrossing" as used herein refers to the repeated crossing of a hybrid progeny back to one of the parental watermelon plants for that line, backcrossing 1, 2, 3, 4, 5, 6, 7, 8, or more times to the recurrent parent. The parental watermelon plant which contributes the gene for the desired characteristic is termed the nonrecurrent or donor parent. This terminology refers to the fact that the nonrecurrent parent is used one time in the backcross protocol and therefore does not recur. The parental watermelon plant to which the gene or genes from the nonrecurrent parent are transferred is known as the recurrent parent as it is used for several rounds in the backcrossing protocol (Poehlman & Sleper, 1994; Fehr, 1987). In a typical backcross protocol, the original cultivar of interest (recurrent parent) is crossed to a second line (nonrecurrent parent) that carries the single gene of interest to be transferred. The resulting progeny from this cross are then crossed again to the recurrent parent and the process is repeated until a watermelon plant is obtained wherein essentially all of the desired morphological and physiological characteristics of the recurrent parent are recovered in the converted plant, in addition to the single transferred gene from the nonrecurrent parent.

The selection of a suitable recurrent parent is an important step for a successful backcrossing procedure. The goal of a backcross protocol is to alter or substitute a single trait or characteristic in the original line. To accomplish this, a single gene of the recurrent cultivar is modified or substituted with the desired gene from the nonrecurrent parent, while retaining essentially all of the rest of the desired genetic, and therefore the desired physiological and morphological, constitution of the original line. The choice of the particular nonrecurrent parent will depend on the purpose of the backcross; one of the major purposes is to add some commercially desirable, agronomically important trait to the plant. The exact backcrossing protocol will depend on the characteristic or trait being altered to determine an appropriate testing protocol. Although backcrossing methods are simplified when the characteristic being transferred is a dominant allele, a recessive allele may also be transferred. In this instance it may be necessary to introduce a test of the progeny to determine if the desired characteristic has been successfully transferred.

Many single gene traits have been identified that are not regularly selected for in the development of a new line but that can be improved by backcrossing techniques. Single gene traits may or may not be transgenic, and examples of these traits include but are not limited to, male sterility, modified fatty acid metabolism, modified carbohydrate metabolism, herbicide resistance, resistance for bacterial, fungal, or viral disease, insect resistance, enhanced nutritional quality, industrial usage, yield stability, and yield enhancement. These genes are generally inherited through the nucleus. Several of these single gene traits are described in U.S. Pat. Nos. 5,777,196, 5,948,957 and 5,969,212, the disclosures of which are specifically hereby incorporated by reference.

Tissue Culture

As used herein, the term "tissue culture" indicates a composition including isolated cells of the same or a different type or a collection of such cells organized into parts of a plant. Exemplary types of tissue cultures are protoplasts, calli, meristematic cells, and plant cells that can generate tissue culture that are intact in plants or parts of plants, such as leaves, pollen, embryos, roots, root tips, anthers, pistils, flowers, seeds, petioles, and the like. Means for preparing and maintaining plant tissue culture are well known in the art. The use of tissue culture to propagate watermelon plants is exemplified in Adelberg, J. W., B. B. Rhodes, *Micropropagation from zygotic tissue of watermelon*, C. E. Thomas (ed.) Proc. of the Cucurbitaceae 89: *Evaluation and enhancement of cucurbit germplasm*, Charleston S.C., USA; and Zhang et al., *Shoot regeneration from immature cotyledon of watermelon*, Cucurbit Genetics Coop. 17:111-115 (1994).

Transformation of plant protoplasts also can be achieved using methods based on calcium phosphate precipitation, polyethylene glycol treatment, electroporation, and combinations of these treatments (see, e.g., Potrykus et al., 1985; Omirulleh et al., 1993; Fromm et al., 1986; Uchimiya et al., 1986; Marcotte et al., 1988). Transformation of plants and expression of foreign genetic elements is exemplified in Choi et al. (1994) and Ellul et al. (2003). Direct uptake of DNA into protoplasts using CaCl2 precipitation, polyvinyl alcohol, or poly-L-ornithine has also been reported (see, e.g., Hain et al., 1985 and Draper et al., 1982). Electroporation of protoplasts and whole cells and tissues have also been described (see, e.g., Saker et al., 1998; Donn et al., 1990; D'Halluin et al., 1992; and Laursen et al., 1994; Chupean et al., 1989).

Additional Breeding Methods

This invention also is directed to methods for producing a diploid, triploid, and tetraploid watermelon plants with spotted phenotypes and commercially desirable characteristics, and using these plants in breeding. In this manner, a diverse array of watermelon patterns (e.g., fruit rind, leaf, etc.), watermelon flesh color, and watermelon taste may be developed and selected for superior qualities including appearance and taste. Further, watermelon varieties may be developed and selected for superior qualities including improved firmness of flesh, improved internal quality, increased yield, and hardiness. Breeding steps that may be used in the watermelon plant breeding program include pedigree breeding, backcrossing, mutation breeding, and recurrent selection. In conjunction with these steps, techniques such as RFLP-enhanced selection, genetic marker enhanced selection (for example SSR markers) and the making of double haploids may be utilized.

Several methods can be used to produce triploid seeds from an inbred tetraploid and/or diploid line. Two commonly used methods are the bee-pollination method and the hand-pollination method. In the United States, the bee-pollination method is generally used to produce triploid watermelon seed. Hand-pollination is mainly used to produce triploid watermelon seed in areas where isolation is not available and several triploid hybrids are produced in the same field block.

Tetraploid watermelon lines can be developed from diploid lines by doubling the chromosomes of diploid watermelon lines using methods routine in the art. Chromosome doubling was first accomplished with the alkaloid colchicine by applying colchicine to the growing point of newly emerged watermelon seedlings. Tissue culture methods have also been developed (Zhang, X. P., B. B. Rhodes, H. T. Skorupska, W. C. Bridges, 1995, Generating Tetraploid Watermelon Using Colchicine in Vitro, G. Lester & J. Dunlap et al. (eds.), Cucurbitaceae '94: 134-139). Dinitroanilines have been used to double chromosome numbers, and their effectiveness has previously been compared with crops other than watermelon. Li et al. compared in vitro chromosome doubling effectiveness using colchicine and the dinitroanilines, ethalfluralin (N-ethyl-N-2-methyl-2-propenyl)-2,6-dinitro-4-(trifluoromethyl)benzanine), and oryzalin (3,5-dinitro-N4,N4-dipropylsulfanilamide) and concluded that either ethalfluralin or oryzalin was preferable to colchicine (Li, Ying, J. F. Whitesides, B. Rhodes, 1999, In vitro generation of tetraploid watermelon with two different dinitroanilines and colchicines, Cucurbit Genetics Cooperative Rpt 22:38-40).

Several treatment methods can be used to induce tetraploids from diploids using the chemicals mentioned above. One exemplary method is to treat the seed before sowing. The seed are soaked in clean water for 5-6 hrs and then the seed are soaked in either colchicine solution (0.2%) or dinitroanilines (e.g. 35 µM oryzalin) for 24 hrs. The seed are briefly rinsed before sowing. Dry seed can also be directly soaked in the chemical solution without pre-soaking in the water. The treatment usually reduces the germination and emergence. A second method is to treat the newly emerged seedling. To illustrate, the diploid inbreds can be sown in the greenhouse in seedling flats. The soil temperature is kept at 29-31° C. for rapid and uniform germination. One drop of colchicine (0.1%) or dinitroanilines (e.g. 35 µM oryzalin) solution is added to the shoot apex between the cotyledons as soon as the seedling has emerged from soil. The colchicine solution is applied to the growing point in the morning or evening for three consecutive days. Good chromosome doubling is achieved from application of oryzalin. Another illustrative method is to treat the shoot apex of germinated seed after which the germinated seed is planted into soil. The seeds are germinated in an incubator at 30° C. When the radicles are about 2 cm long, the portion above the hypocotyls of germinated seeds is immersed upside down into colchicine (0.1%) or dinitroaniline solution (35 µM oryzalin) for 10-15 hrs at 30° C. in an incubator. The treatment is typically conducted in a high humidity chamber or box to assure that the radicles/roots are not desiccated. The seeds are then washed and planted in the soil. The last two methods, although more tedious to use, usually give better recovery of tetraploid events as the root system is not affected by the treatment.

The next step is to develop tetraploid lines from individual converting events. For example, the selected tetraploid individuals based on morphological expression can be self-pollinated and the resulting seeds planted in the next generation as lines. These lines can again be self-pollinated and compared for fertility and horticultural traits. Only the desirable lines are selected if there is difference among these lines. Desirable lines may be bulk harvested if there is no variation within the line and among selected lines. Further seed increases may be conducted in an isolation block. Mass selection may be conducted for this increase in the isolation plot and thereafter. Fertility of the tetraploid may be improved in subsequent generations.

Crossing two different tetraploids and then going through recombination breeding can also result in new tetraploid lines. A longer breeding period is typically employed to develop a stable tetraploid line using this approach because of the larger number of combinations and the fewer seed that tetraploids produce. However, some breeders have made good progress by taking this approach.

Because meiosis is sometimes irregular in autotetraploids, there can be diploids and aneuploids among the offspring. The leaves, flowers and pollen grains of tetraploids are morphologically distinct from diploids (Zhang, X. P., B. B. Rhodes, H. T. Skorupska, W. C. Bridges, 1995, *Generating Tetraploid Watermelon Using Colchicine in Vitro*, G. Lester & J. Dunlap et al. (eds.), Cucurbitaceae '94: 134-139). Tetraploids also have a different number of chloroplasts in the guard cells (Compton, M. E., D. J. Gray and G. W. Elmstrom. 1996, *Identification of tetraploid regenerants from cotyledons of diploid watermelon cultures in vitro*, Euphytica 87:165-172). These morphological traits can help the breeder eliminate the diploids and aneuploids occurring in the tetraploid population during sexual propagation. Diploid reversions can also be identified in situations in which a diploid derived from a tetraploid line is desired, and such diploid reversions are also encompassed by the present invention.

The cultivar of the invention can also be used for transformation where exogenous genes are introduced and expressed by the cultivar of the invention. Genetic variants of hybrid 'E26S.00171' created either through traditional breeding methods or through transformation of hybrid 'E26S.00171' by any of a number of protocols known to those of skill in the art are intended to be within the scope of this invention.

Mutations for use in mutation breeding can be induced in plants by using mutagenic chemicals such as ethyl methane sulfonate (EMS), by irradiation of plant material with gamma rays or fast neutrons, or by other means. The resulting nucleotide changes are random, but in a large collection of mutagenized plants the mutations in a gene of interest can be readily identified by using the TILLING (Targeting Induced Local Lesions IN Genomes) method (McCallum et al. (2000) Targeted screening for induced mutations. Nat. Biotechnol. 18, 455-457, and Henikoff et al. (2004) TILLING. Traditional mutagenesis meets functional genomics. Plant Physiol. 135, 630-636). The principle of this method is based on the PCR amplification of the gene of interest from genomic DNA of a large collection of mutagenized plants in the M2 generation. By DNA sequencing or by looking for point mutations using a single-strand specific nuclease, such as the CEL-I nuclease (Till et al. (2004) Mismatch cleavage by single-strand specific nucleases. Nucleic Acids Res. 32, 2632-2641), the individual plants that have a mutation in the gene of interest are identified. By screening many plants, a large collection of mutant alleles is obtained, each giving a different effect on gene expression or enzyme activity. The gene expression or protein levels can for example be tested by transcript analysis levels (e.g., by RT-PCR) or by quantification of protein levels with antibodies. Plants with the desired reduced gene expression or reduced protein expression are then backcrossed or crossed to other breeding lines to transfer only the desired new allele into the background of the crop wanted.

Genes of interest for use in breeding may also be edited using gene editing techniques including transcription activator-like effector nuclease (TALEN) gene editing techniques, Clustered Regularly Interspaced Short Palindromic Repeat (CRISPR/Cas9) gene editing techniques, and/or zinc-finger nuclease (ZFN) gene editing techniques. For this, transgenic plants are generated expressing one or more constructs targeting the gene of interest. These constructs may include, without limitation, an anti-sense construct, an optimized small-RNA construct, an inverted repeat construct, a targeting construct, a guide RNA construct, a construct encoding a targeting protein, and/or a combined sense-anti-sense construct, and may work in conjunction with a nuclease, an endonuclease, and/or an enzyme, so as to downregulate the expression of a gene of interest.

One of ordinary skill in the art of plant breeding would know how to evaluate the traits of two plant varieties to determine if there is no significant difference between the two traits expressed by those varieties. For example, see Fehr and Walt, Principles of Cultivar Development, p. 261-286 (1987). Thus the invention includes watermelon plants including a combination of at least two traits selected from the combination of traits listed in the Summary of the Invention for hybrid 'E26S.00171', so that said progeny watermelon plant is not significantly different for said traits than watermelon hybrid 'E26S.00171', as determined at the 5% significance level when grown in the same environmental conditions and/or may be characterized by percent similarity or identity to watermelon hybrid 'E26S.00171', as determined by SSR markers. Mean trait values may be used to determine whether trait differences are significant, and preferably the traits are measured on plants grown under the same environmental conditions. Once such a variety or line is developed its value is substantial since it is important to advance the germplasm base as a whole in order to maintain or improve traits such as firmness of flesh, internal quality, taste, appearance, yield, disease resistance, pest resistance, and plant performance in extreme environmental conditions.

As used herein, the term "plant" includes plant cells, plant protoplasts, plant cell tissue cultures from which watermelon plants can be regenerated, plant calli, plant clumps, and plant cells that are intact in plants or parts of plants, such as leaves, pollen, embryos, cotyledons, hypocotyl, roots, root tips, anthers, pistils, flowers, seeds, stems, and the like.

The use of the terms "a," "an," and "the," and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

EXAMPLES

The presently disclosed subject matter will be better understood by reference to the following Examples, which are provided as exemplary of the invention, and not by way of limitation.

Example 1: Assessment of the Spot Allele Dosage in Spotted Watermelons

This example describes the identification of markers able to identify dosage of the spot allele in spotted watermelon lines.

Materials and Methods

Samples

Multiple spotted watermelon populations were used for testing. Young leaf samples were obtained from each of the following: (1) a tetraploid F2 population segregating for the spot locus, (2) triploid variety with one spot allele (33%), (3) triploid variety with two spot alleles (66%), (4) triploid variety with three spot alleles (100%), (5) tetraploid line with a present spot locus, (6) tetraploid line with an absent spot locus, (7) diploid line with a present spot locus, and (8) diploid line with an absent spot locus.

Marker Candidates

A diploid F2 population was used to map the region associated with the spot phenotype. The results obtained from this F2 population were compared with whole genome resequencing of two lines showing the spot phenotype. Fine mapping and recombinant selection was then done on two populations.

The reference genome of 'Charleston Gray' (Wu et al. Plant Biotechnol J. 2019 December; 17(12):2246-2258. doi: 10.1111/pbi.13136) was used. The mapping process identified the region linked to the spot phenotype as being between 86340 (start) and 242510 (end) on CG_Chr04 ('Charleston Gray' Chromosome 4). In this region, 145 SNPs were identified.

Phenotypic Assessment of Mapping Population

The diploid F2 population used to map the region was phenotyped for leaf appearance (visual assessment, not quantitative). A pre-grouping of sample plants was done based on spot density.

High Resolution Melting Analysis

An amplicon of 196 bp was generated by PCR on genomic DNA following standard setup. Post amplification analysis by high-resolution melting curve was performed following manufacturer recommended settings for temperature ramping and fluorescence acquisition. The melting curves were then normalized and analyzed using an internal software.

Results

The phenotypic assessment of the F2 diploid mapping population identified some plants with higher leaf spot density (FIGS. 4A-4D), and some plants with lower leaf spot density (FIGS. 4E-4H). Plants with these distinct phenotypes were separated into two groups. Subsequent analysis with markers (see below) confirmed that these phenotypes corresponded to different levels of spotted allele dose. Those plants with lower leaf spot density (FIGS. 4E-4H) were found to be heterozygous, i.e., have 50% spotted allele dose, while those plants with higher leaf spot density (FIGS. 4A-4D) were found to be homozygous, i.e., have 100% spotted allele dose. Without wishing to be bound by theory, it is thought that the allele percentage may correlate with leaf spot density in diploid spotted plants.

Two SNP markers were identified that were able to assess the number of spot alleles in watermelons with different ploidy, which are provided in Table 2, below.

TABLE 2

SNP markers.

| Chromosome | Position | SNP in 'Charleston Gray' | SNP in Samples |
|---|---|---|---|
| CG_Chr04 | 134886 | A | T |
| CG_Chr04 | 86340 | A | G |

Figure 4:
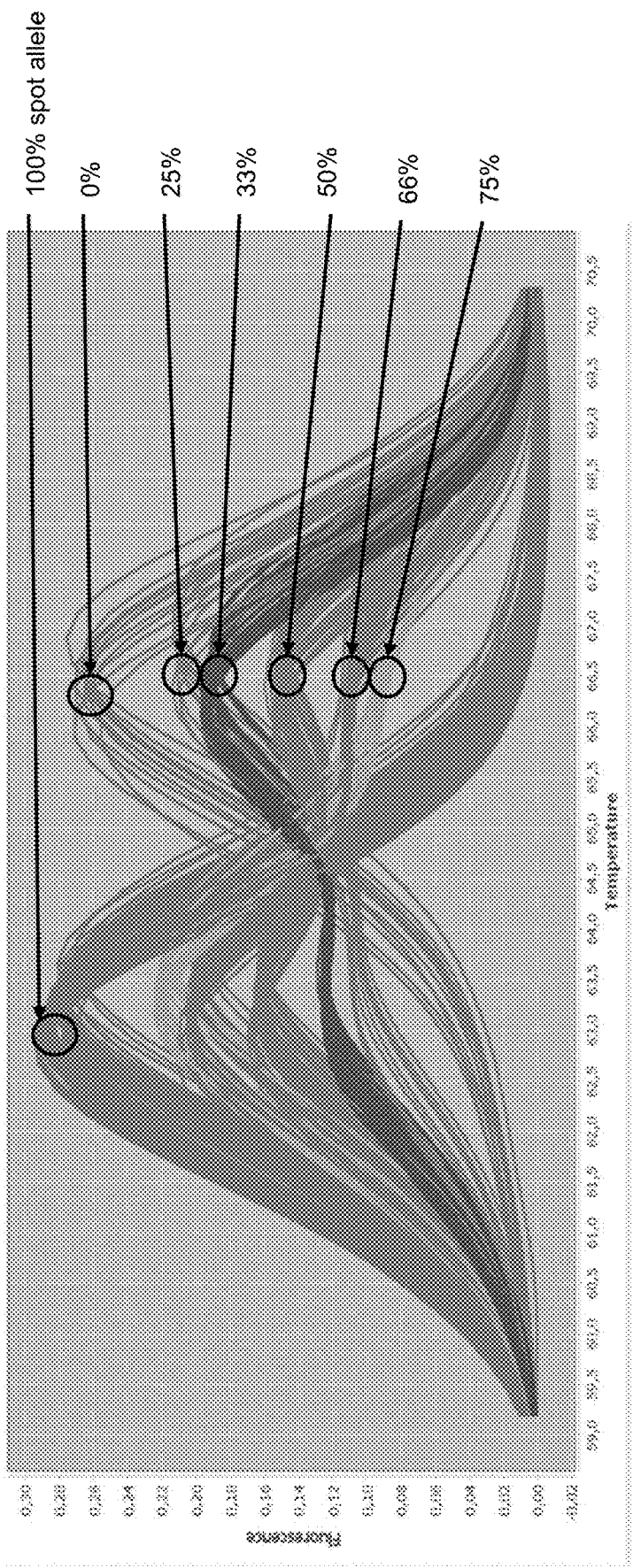
FIG. 4 shows the results of high resolution melting curve analysis. Each group of curves shown in different grey shades corresponds to a specific percentage of spot allele, from top to bottom: 100% spot allele, 0% spot allele, 25% spot allele, 33% spot allele, 50% spot allele, 66% spot allele, and 75% spot allele (black circle designates grouping of curves).

FIG. 4 shows the results of the high resolution melting analysis conducted using primers and a probe directed to the SNP at position 134886. Each group of curves with a black circle corresponded to a specific percentage of spot allele. Table 3, below, provides the percentages, the number of alleles present, and the corresponding ploidies. For example, 75% spotted was only possible in tetraploid lines, which can have up to four spotted alleles.

TABLE 3

High resolution melting analysis results.

| % Spot Allele | Number of spotted alleles | Ploidy |
|---|---|---|
| 100% | Homozygous present | All |
| 75% | 3 alleles | Tetrapioid (4n) |
| 66% | 2 alleles | Triploid (3n)_ |
| 50% | 2 alleles | Tetrapioid (4n) |

TABLE 3-continued

High resolution melting analysis results.

| % Spot Allele | Number of spotted alleles | Ploidy |
|---|---|---|
| 50% | 1 allele | Diploid (2n) |
| 33% | 1 allele | Triploid (3n) |
| 25% | 1 allele | Tetrapioid (4n) |
| 0% | Homozygous absent | All |

These results clearly showed that the identified markers were able to distinguish the allele percentage present in spotted watermelon lines and varieties. Thus, these markers may be used in breeding and/or selection of spotted watermelon lines and varieties.

Example 2: Phenotypic and Genotypic Ratios for a Segregating Spotted Diploid Watermelon, and Breeding of a Homozygous Spotted Diploid Line (HSDL)

This example describes the phenotypic and genotypic ratios for a segregating diploid watermelon, as well as the breeding process to obtain a new homozygous spotted diploid line (HSDL).

Materials and Methods

Spotted Alleles

Spotted plants were identified by phenotypic assessment. The spotted allele underlying the spotted phenotype was designated as "A", while the non-spotted allele was designated as "a".

Breeding Process

The initial cross was of a spotted plant with a non-spotted plant. The spotted plant was identified by phenotype alone. The F1 generation produced by this cross all had the spotted phenotype. Then, the F1 generation was self pollinated to produce a F2 generation.

Results

The phenotypes observed in the F2 generation indicated that the F1 generation had the genotype of Aa, i.e., was heterozygous for the spotted allele. There were are four possible combinations of the spotted genotype observed in the F2 population. Table 4A shows the genotypic ratios, while Table 4B shows the phenotypic ratios.

TABLE 4A

Genotypic ratios in F2 population.

|   | A | a |
|---|---|---|
| A | AA | Aa |
| a | Aa | aa |

TABLE 4B

Phenotypic ratios in F2 population.

|   | A | a |
|---|---|---|
| A | Spotted (100%) | Spotted (50%) |
| a | Spotted (50%) | Not spotted (0%) |

As can be seen from Table 4B, the phenotype of the F2 population was 3:1 spotted, with two different percentages of spotted allele (100% and 50%). The F2 plants with the spotted phenotype were then self pollinated and selected for the spotted phenotype for a sufficient number of generations to produce a new homozygous spotted diploid line (HSDL). FIG. 5 shows an exemplary diploid watermelon line with 100% spot allele.

The markers identified in Example 1 can be used to facilitate the breeding process described in this Example. Specifically, the markers for the spot allele are very helpful to use at the F2 stage in order to select the material with the higher dosage of spotted alleles, namely 100% (AA). The use of these markers will allow the production of a diploid line homozygous for the spotted trait (HSDL) in fewer generations of inbreeding.

Example 3: Genotypic Ratios for a Segregating Tetraploid Watermelon, and Breeding of a Homozygous Spotted Tetraploid Line (HSTL)

This example describes the phenotypic and genotypic ratios for a segregating tetraploid watermelon, as well as the breeding process to obtain a new homozygous spotted tetraploid line (HSTL).

Materials and Methods

Spotted Alleles

Spotted plants were identified by phenotypic assessment. The spotted allele was designated as "A", while the non-spotted allele was designated as "a".

Breeding Process

The initial cross was of a spotted plant with a non-spotted plant. The spotted plant was identified by phenotype alone. The F1 generation produced by this cross all had the spotted phenotype. Then, the F1 generation was self pollinated to produce a F2 generation.

Results

The phenotypes observed in the F2 generation indicated that the F1 generation had the genotype of AAaa, i.e., was heterozygous for the spotted allele. There were thirty-six possible combinations of the spotted genotype observed in the F2 population. Table 5A shows the genotypic ratios, while Table 5B shows the phenotypic ratios.

TABLE 5A

Genotypic ratios in F2 population.

|    | AA | Aa | Aa | Aa | Aa | aa |
|----|----|----|----|----|----|----|
| AA | AAAA | AAAa | AAAa | AAAa | AAAa | AAaa |
| Aa | AAAa | AAaa | AAaa | AAaa | AAaa | Aaaa |
| Aa | AAAa | AAaa | AAaa | AAaa | AAaa | Aaaa |
| Aa | AAAa | AAaa | AAaa | AAaa | AAaa | Aaaa |
| Aa | AAAa | AAaa | AAaa | AAaa | AAaa | Aaaa |
| aa | AAaa | Aaaa | Aaaa | Aaaa | Aaaa | aaaa |

TABLE 5B

Phenotypic ratios in F2 population.

|    | AA | Aa | Aa | Aa | Aa | aa |
|----|----|----|----|----|----|----|
| AA | Spotted (100%) | Spotted (75%) | Spotted (75%) | Spotted (75%) | Spotted (75%) | Spotted (50%) |
| Aa | Spotted (75%) | Spotted (50%) | Spotted (50%) | Spotted (50%) | Spotted (50%) | Spotted (25%) |
| Aa | Spotted (75%) | Spotted (50%) | Spotted (50%) | Spotted (50%) | Spotted (50%) | Spotted (25%) |

TABLE 5B-continued

Phenotypic ratios in F2 population.

|    | AA               | Aa               | Aa               | Aa               | Aa               | aa                      |
|----|------------------|------------------|------------------|------------------|------------------|-------------------------|
| Aa | Spotted (75%)    | Spotted (50%)    | Spotted (50%)    | Spotted (50%)    | Spotted (50%)    | Spotted (25%)           |
| Aa | Spotted (75%)    | Spotted (50%)    | Spotted (50%)    | Spotted (50%)    | Spotted (50%)    | Spotted (25%)           |
| aa | Spotted (50%)    | Spotted (25%)    | Spotted (25%)    | Spotted (25%)    | Spotted (25%)    | Not spotted (0%)        |

As can be seen from Table 5B, the phenotype of the F2 population was 35:1 spotted, with four different percentages of spotted allele (100%, 75%, 50%, and 25%). The F2 plants with the spotted phenotype were then self pollinated and selected for the spotted phenotype for a sufficient number of generations to produce a homozygous spotted tetraploid line (HSTL). FIG. 6 shows an exemplary tetraploid watermelon line with 100% spot allele.

The markers identified in Example 1 can be used to facilitate the breeding process described in this Example. Specifically, the markers for the spot allele are very helpful to use at the F2 stage in order to select the material with the higher dosage of spotted alleles, namely 100% (AAAA). The use of the marker allows the production of a tetraploid line homozygous for the spotted trait (HSTL) in fewer generations of inbreeding.

The invention claimed is:

1. A method of producing a spotted watermelon plant, comprising:
   a) crossing a spotted watermelon plant to a watermelon plant to produce a population of progeny watermelon plants;
   b) genotyping the population of progeny watermelon plants for a presence of a marker linked to a spotted allele, wherein the spotted allele is located between position 134886 and position 86340 on Chromosome 4 of a 'Charleston Gray' genome;
   wherein the marker comprises a first marker comprising a T at position 101 of SEQ ID NO: 1 and/or a second marker comprising a G at position 101 of SEQ ID NO: 6; and
   c) selecting a progeny plant on the basis of the presence of the one or more sequences genotyped in (b), wherein the progeny watermelon plant is spotted.

2. The method of claim 1, wherein genotyping of the first marker comprises the use of a forward primer comprising SEQ ID NO: 3, a reverse primer comprising SEQ ID NO: 4, and/or a probe comprising SEQ ID NO: 5, and wherein genotyping of the second marker comprises the use of a forward primer comprising SEQ ID NO: 8, a reverse primer comprising SEQ ID NO: 9, and/or a probe comprising SEQ ID NO: 10.

3. The method of claim 1, wherein the marker comprises the marker comprising a T at position 101 of SEQ ID NO: 1.

4. The method of claim 3, wherein genotyping of the marker comprising a T at position 101 of SEQ ID NO: 1 comprises the use of a forward primer comprising SEQ ID NO: 3, a reverse primer comprising SEQ ID NO: 4, and/or a probe comprising SEQ ID NO: 5.

5. The method of claim 1, wherein the marker comprises the marker comprising a G at position 101 of SEQ ID NO: 6.

6. The method of claim 5, wherein genotyping of the marker comprising a G at position 101 of SEQ ID NO: 6 comprises the use of a forward primer comprising SEQ ID NO: 8, a reverse primer comprising SEQ ID NO: 9, and/or a probe comprising SEQ ID NO: 10.

7. The method of claim 1, wherein the marker comprises the first marker comprising a T at position 101 of SEQ ID NO: 1 and the second marker comprising a G at position 101 of SEQ ID NO: 6.

8. The method of claim 7, wherein genotyping of the first marker comprises the use of a forward primer comprising SEQ ID NO: 3, a reverse primer comprising SEQ ID NO: 4, and/or a probe comprising SEQ ID NO: 5, and wherein genotyping of the second marker comprises the use of a forward primer comprising SEQ ID NO: 8, a reverse primer comprising SEQ ID NO: 9, and/or a probe comprising SEQ ID NO: 10.

9. The method of claim 1, wherein the progeny watermelon plants are diploid watermelon plants, triploid watermelon plants, or tetraploid watermelon plants.

10. The method of claim 1, wherein the progeny watermelon plants are diploid watermelon plants.

11. The method of claim 1, wherein the progeny watermelon plants are tetraploid watermelon plants.

12. The method of claim 1, wherein the progeny watermelon plants are triploid watermelon plants.

13. The method of claim 12, wherein step (a) comprises crossing a diploid watermelon plant with a tetraploid watermelon plant to produce the population of progeny watermelon plants.

14. The method of claim 1, comprising:
   d) isolating seeds from the selected progeny plant.

15. The method of claim 1, wherein the spotted progeny watermelon plant is homozygous for the spotted allele.

16. The method of claim 1, wherein the spotted progeny watermelon plant is diploid and its genome comprises one of the spotted allele.

17. The method of claim 1, wherein the spotted progeny watermelon plant is triploid and its genome comprises one or two of the spotted allele.

18. The method of claim 1, wherein the spotted progeny watermelon plant is tetraploid and its genome comprises two of the spotted allele.

* * * * *